(12) United States Patent
Lefebvre et al.

(10) Patent No.: US 10,235,346 B2
(45) Date of Patent: Mar. 19, 2019

(54) METHOD AND APPARATUS FOR INBOUND MESSAGE SUMMARIZATION USING MESSAGE CLUSTERING AND MESSAGE PLACEHOLDERS

(71) Applicant: Connexive, Inc., Los Altos, CA (US)

(72) Inventors: Martin Claude Lefebvre, Los Altos, CA (US); Lucas Wiman, Mountain View, CA (US)

(73) Assignee: HMBay Patents LLC, Half Moon Bay, CA (US)

( * ) Notice: Subject to any disclaimer, the term of this patent is extended or adjusted under 35 U.S.C. 154(b) by 307 days.

(21) Appl. No.: 13/743,207

(22) Filed: Jan. 16, 2013

(65) Prior Publication Data

US 2013/0268839 A1    Oct. 10, 2013

Related U.S. Application Data

(60) Provisional application No. 61/621,092, filed on Apr. 6, 2012.

(51) Int. Cl.
*G06F 17/21* (2006.01)
*G06Q 10/10* (2012.01)

(52) U.S. Cl.
CPC ........... *G06F 17/21* (2013.01); *G06Q 10/107* (2013.01)

(58) Field of Classification Search
CPC .............................. G06Q 10/107; G06F 17/21
See application file for complete search history.

(56) References Cited

U.S. PATENT DOCUMENTS

| 5,903,880 | A | 5/1999 | Biffar |
| 7,788,262 | B1 * | 8/2010 | Shirwadkar ................... 707/737 |
| 7,814,155 | B2 * | 10/2010 | Buchheit et al. ..... G06Q 10/107 |
| | | | 709/206 |
| 8,903,924 | B2 * | 12/2014 | Jensen et al. .................. 709/206 |
| 9,600,806 | B2 * | 3/2017 | Baggett ................ G06Q 10/107 |
| 2002/0091829 | A1 | 7/2002 | Wood et al. |
| 2002/0198849 | A1 | 12/2002 | Piikivi |
| 2004/0167820 | A1 | 8/2004 | Melick et al. |
| 2006/0230039 | A1 | 10/2006 | Shull et al. |
| 2007/0156732 | A1 * | 7/2007 | Surendran et al. ........... 707/101 |
| 2008/0288382 | A1 | 11/2008 | Smith et al. |
| 2011/0067036 | A1 | 3/2011 | Hickford et al. |

(Continued)

OTHER PUBLICATIONS

Bergman, et al., A Personal Email Assistant, Lab Report, Aug. 2002, 23 pages, HPL-2002-236, Hewlett-Packard Company, Palo Alto, CA, USA.

(Continued)

*Primary Examiner* — Cesar B Paula
*Assistant Examiner* — Konrad J Kulikowski
(74) *Attorney, Agent, or Firm* — Haynes Beffel & Wolfeld LLP; Ernest J. Beffel, Jr.

(57) ABSTRACT

Method for displaying a message summary by analyzing the message to identify a sending institution and a message type. A message cluster is determined from the sending institution and repository of messages for multiple users. Extracted items can be identified in the message using the message type. Then the message summary can be generated using the extracted items, the message cluster, and the message structure. These summaries can be used to efficiently summarize a large volume of messages compactly.

23 Claims, 16 Drawing Sheets

(56) References Cited

U.S. PATENT DOCUMENTS

| | | |
|---|---|---|
| 2011/0093367 A1 | 4/2011 | Stapleton |
| 2011/0131034 A1* | 6/2011 | Moyle ............... G06F 17/30427 704/9 |
| 2011/0162047 A1 | 6/2011 | Reeves et al. |
| 2011/0209196 A1 | 8/2011 | Kennedy |

OTHER PUBLICATIONS

Faulring, et al., Agent-Assisted Task Management that Reduces Email Overload, Journal, Feb. 2010, 10 pages, ACM 978-1-60558-515-4/10/02, IUI'10, Hong Kong, China.

Faurling, et al., A Demonstration of the RADAR Personal Assistant, Journal, 2008, 2 pages, Association for the Advancement of Artificial Intelligence.

Freed, et al., RADAR: A Personal Assistant that Learns to Reduce Email Overload, Journal, 2008, 7 pages, Association for the Advancement of Artificial Intelligence.

Garlan, et al., The RADAR Architecture for Personal Cognitive Assistance, Journal, 20 pages, International Journal of Software Engineering and Knowledge Engineering, World Scientific Publishing Company.

Kushmerick, et al., Activity-Centric Email: A Machine Learning Approach, Journal, 2006, 4 pages, Association for the Advancement of Artificial Intelligence.

Office Action dated Feb. 12, 2013 in U.S. Appl. No. 13/353,305.

Response to Office Action in U.S. Appl. No. 13/353,305 dated Apr. 24, 2013.

* cited by examiner

Area 2310

Email Log Filtered by NEWSLETTER

Today

Message 2710 — Chales Schwab Newsletter — Market Alert: Credit Suisse First Edition- U.s. Alert for March 15,2012

| Price Performance at 4.43PM EDT 03-15-2012 | | Today | One Month | Three Month | One year |
|---|---|---|---|---|---|
| Dow | Today's Close | +0.44% | +3.69% | +11.66% | +11.79% |
| S&P500 | Today's Close | +0.60 | +4.42% | +15.37% | +9.42% |
| Nasdaq | Today's Close | +0.53% | | +20.28% | +14.59% |

Message Type Filter 2720

Chales Schwab Newsletter — Market Alert: Credit Suisse First Edition- U.s. Alert for March 15,2012
Martin Price Performance at 5:16PM EDT 03-14-2012 — Wednesday One Month Three Month One Year Dow — Today's Close — +0.12% +2.45% +11.59% +10.03%

Courtyard Salt Lake City Layton Reservation Confirmation #80147061 — Mar8

S&P500 — Today's Close — -0.12% +3.24% +15.06% +7.55%

Nasdaq — Today's Close — +0.03% +3.73% +19.75% +12.58%

Message 2714 — The Economist Newsletter — Highlights of news coverage from March 10th - 16th, 2012

Highlights from The Economist online's Buisness this week
>> China's economy: Fears of Hard landing
>> Rare earths and climate change: In a hole?
>> US Banks: Destressing news
>> Goldman Sachs: A nosly exit
>> Greece's default: The wait is over
>> Yahoo! v Facebook: Making a tough job harder
>> Get more access to *The Economist* with a print of digital subscription.
Already a print subscrier? Activate your online account
>> China reported a trade deficit of $31.5 billion for February, the
largest decade, as imports grew at twice the rate of
exports. Factories were closed during Chinese new-year
celebrations, which may be one factor behind the slackest exports. But
with global demand fragile and separate data showing a slowdown in
Chinese car sales and industrial production, many observers are now
betting that the central bank will do more to boost the economy. See
article>>

China's trade balance $bn

Trading barbs

>> America (and others) took a "first step" in bringing a dispute with
China over restrictions on exports of rare-earth minerals to the WTO.
.China says it limits exports because of concerns over the industry's
environmental impact, but America argues that the controls create " massive distortions" in the market. China rejected the
claim as groundless, and warned America to tread cautiously when handling trade disputes. See article>>

>> Airbus suggested that row between Europe and China about the forced participation of its airlines in the **European
emissions-trading scheme** could lead to "suspensions, cancellations and punitive actions" in retaliation. China is the most
vocal opponent of the policy and is with holding final approval on orders for dozens
of airbus aircraft.
>> Meanwhile, 26 American economists, including five Novel laureates, endorsed Europe's emissions-trading scheme as
"innovative" effort to price carbon.

>> The Federal Reserve released the results of the latest "stress tests" of America's big banks. which have to prove that they
can withstand a number of economic shocks, such as the unemployment rate reaching 13%.
Fifteen of the 19 banks under review passed the tests, but four did not, including Citigroup. See article>>

FIG. 7

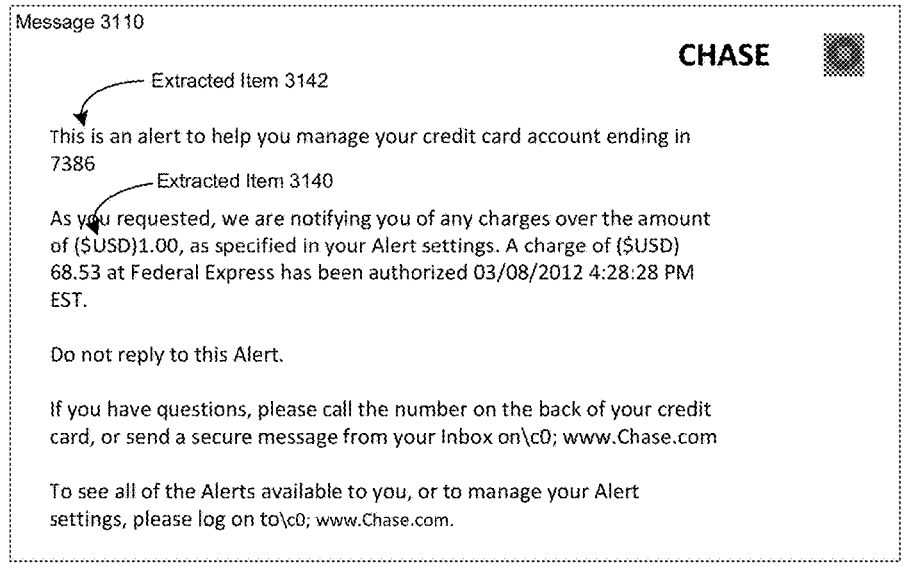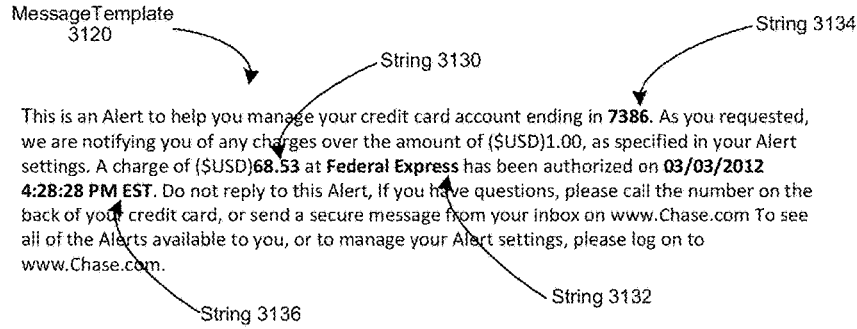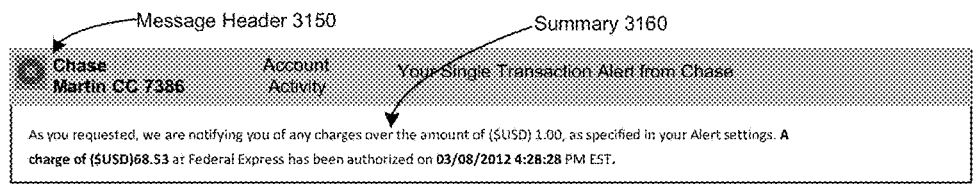
FIG. 13

Message 3210

To ensure delivery, add onlinebanking@ealerts.bankofamerica.com to your address book.

Exclusively for: | JOHN DOE                    Bank of America 

Online Banking Alert
Money Transfer Deducted from Account

Security Checkpoint

You last signed in to Online Banking on 09/17/2011.
Remember: Always look for your Sitekey before entering your Passcode.

To : JOHN DOE
     Account : MYACCESS CHECKING ending in 2190
Transaction date : 02/29/2012
     Amount : $419.23

A money transfer over the amount you specified has occurred.

To review this transaction, please sign in to Online Banking. Please call us immediately at 1.800.622.8731 if you do not recognize this transaction.

Want to confirm this email is from Bank of America? sing in to Online Banking and go to Alerts. The Alerts History lists the Alerts sent to you in the past 60 days.

Want to get more alerts? sing in your online banking account at Bank of America and within the Accounts Overview page select the " Alerts" tab.

Security Checkpoint: This mail include Security Checkpoint. This information in this section lets you know this is an authentic communication from Bank of America. Remember to look for your SiteKey every time you sign in to Online Banking.

Email Preferences
This is a service mail from Bank of America. Please note that you may have receive service email in accordance with your Bank of America service agreements, whether or not you elect to receive promotional email.

Contact us about this email
Please do not reply to this email with sensitive information, such as an account number, PIN, password, or Online ID. The Security and confidentiality of your personal information is important to us. If you have any questions, please either call the phone number on your account statement or use the Contact Us page, so we can properly verify your identity.

METHOD AND APPARATUS FOR INBOUND MESSAGE SUMMARIZATION USING MESSAGE CLUSTERING AND MESSAGE PLACEHOLDERS

RELATED CASES

This is a non-provisional application of provisional application Ser. No. 61/621,092 by Lefebvre et al., filed 6 Apr. 2012, entitled "Method and Apparatus for Inbound Message Summarization".

BACKGROUND

Field

This disclosure is generally related to an inbound message management system that individuals use in order to manage communications from businesses with which they have relationships. More specifically, this disclosure is related to providing automated processing and summarization of the inbound communications.

Related Art

Tools such as the Organizer product from OtherInbox, and Priority Inbox from Google, can automatically analyze, prioritize and summarize emails coming into a user's inbox from institutions. Still other tools such as TripIt allow individual emails to be forwarded to a dedicated email address to facilitate presenting a single view of travel-related information.

Additionally, university research projects such as RADAR (See, e.g., "RADAR: A Personal Assistant that Learns to Reduce Email Overload," Freed, Carbonell, et al., 2008) have focused on providing virtual assistants for processing and handling email to assist in performing tasks related to those emails.

BRIEF DESCRIPTION OF THE FIGURES

FIG. 7 shows a user interface for an embodiment in email log filtered by message type view.

FIG. 13 shows an embodiment for message text summarization.

FIGS. 14-15 show an embodiment for HTML message summarization.

DETAILED DESCRIPTION

Overview

Figure 1:
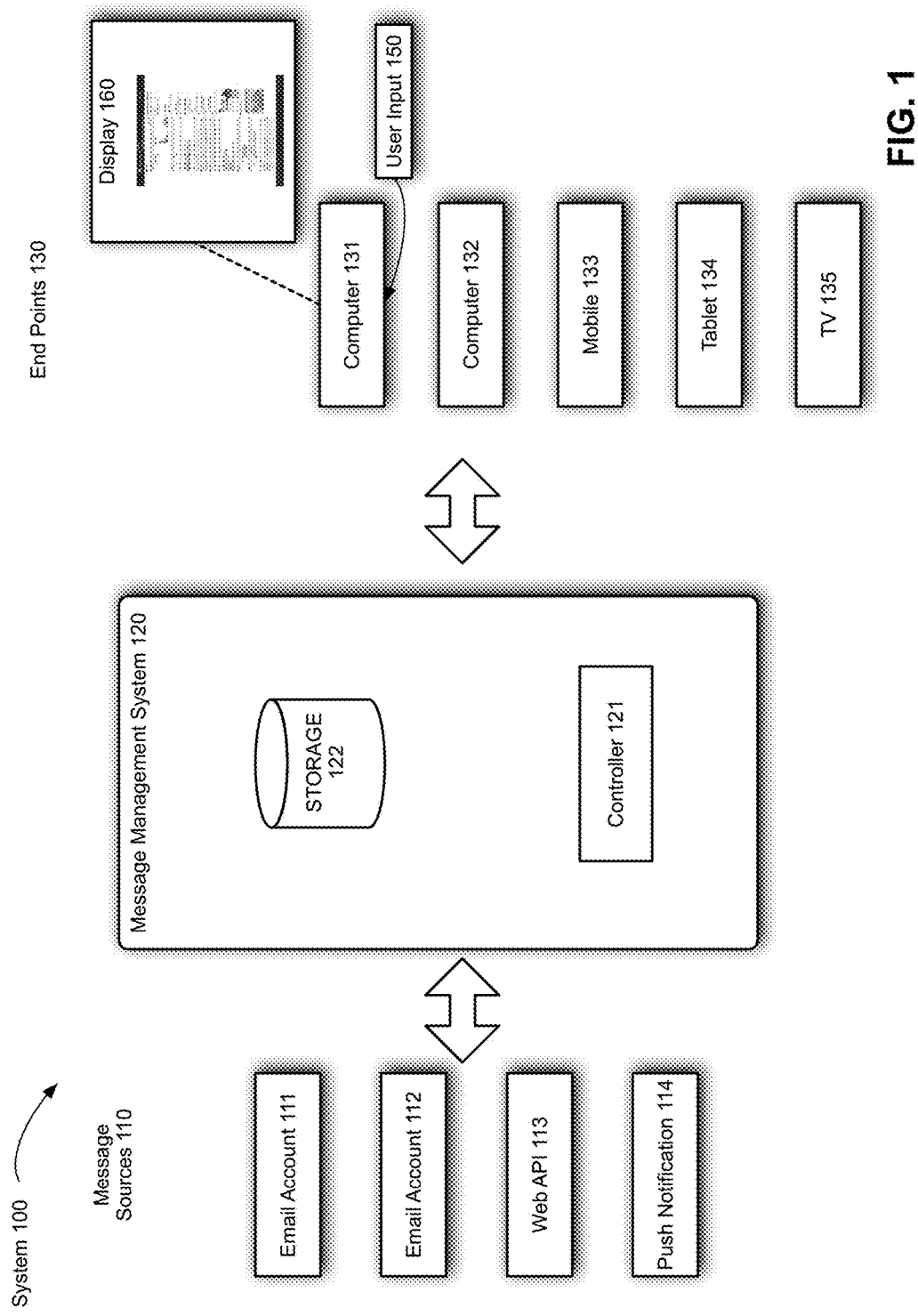
FIG. 1 shows an architectural level schematic of a system in accordance with an embodiment.

The discussion is organized as follows. First, an introduction describing some of the problems addressed by various embodiments will be presented, followed by an explanation of terminology that will be used throughout the discussion. Then, a high level description of one embodiment will be discussed at an architectural level along with a data model. Next, the user interface used by some embodiments will be discussed in conjunction with the details of algorithms used by some embodiments. Lastly, various alternative embodiments are discussed.

Let's consider the Doe household with two adults, John and Jane, and a college aged child, Sarah. The Doe household may have a wide array of relationships with financial institutions; billers such as utilities; brokerages; 401K companies; health care providers; retailers; insurance companies; and rewards programs. Information from these institutions may flow into a variety of locations: bills might primarily flow into Jane's personal email account; brokerage statements might flow into John's personal email account; travel plans for Jane's work into her work email; shopping reward credits into John's personal email; and, Sarah's debit card statements into her college email. It is desirable to provide a snapshot that encompasses more than just finances. Such a snapshot should include the wide variety of activities involved in running the Doe household.

We describe a system and various embodiments to provide a message management system with automatic message summarization. This enables a user to rapidly and easily consume a large number of email messages originating from a plurality of businesses. Additionally, the system's aggregation, organization and summarization capabilities may have the effect of causing users to opt in to more notices, coupons and other messages from companies because the system will aggregate and manage the information for them effectively.

Terminology

Throughout this specification the following terms will be used:

Registered User, or User: An individual who wishes to use the service registers as a user, e.g. registered user or user. To help with enabling the aggregation of household information, each registered user can be associated with one or more system accounts. Individuals can access the system using access credentials of their selection, e.g. username/password, secure tokens, one time passwords, OAuth (including variations such as Facebook, Gmail, Yahoo, etc.), and/or other authentication approaches. Once authenticated they can access the information about the system accounts with which their user is associated.

System Account: A system account is an aggregation of information about multiple registered users, providing the foundation for a snapshot of a household. Each system account may have a primary registered user who can add or remove additional registered users' access to the system account.

Institution: An institution is an entity, such as a company, with which registered users have relationships. Examples include banks, airlines, electric companies, phone companies, brokerages, mutual fund companies, insurers, health care providers, rewards programs, stores, online retailers, and the like.

Institution Account: An institution account is a representation of a relationship between a registered user and an institution, e.g., a bank account, a brokerage account, an Amazon shopping account, a Bank of America checking account, and a frequent flyer program account. Many institution accounts have a unique number, e.g. bank account number, rewards program number, Social Security number, email address. "Account" may be used as shorthand to refer to either institution accounts or system accounts, during this discussion, and the meaning will be apparent from the usage.

Online Identity: An online identity is a set of credentials that a registered user uses to access an institution account. A single online identity may provide access to multiple institution accounts, e.g. for the Doe family, John's username/password accesses all of the Bank of America institution accounts for John's Social Security number. Similarly, a single institution account may be accessible with multiple online identities, e.g. both Jane's username/password and John's username/password can access the joint bank account.

Payment Methods: A payment method is a representation of a method for system accounts to pay bills, such as the use of credit cards, online bill pay (OLBP) services accessed via a web browser or a mobile application, debit cards, electronic fund transfer (EFT) from an asset account, Paypal, pay-by-touch systems such as those that use near field communications, pay-by-mobile or cellphone, and manual payments. Payment methods facilitate use of the system account by registered users to pay institution account bills.

Message Streams: Each registered user can associate one or more inbound message streams with one or more system accounts. Once a user has established a message stream, the system imports, and processes messages from known institutions. The list of known institutions is generally maintained in a master list for all users, but some embodiments may allow per-user customizations, as well as feedback provided by users of the system to update the master list. For push notifications and web APIs, relevant messages are imported. In some instances in the specification, a distinction may be made between a message stream, e.g. the database representation of a message source, and the underlying message source itself. For example, in the case of IMAP or POP, the remote IMAP or POP repository is the message source, while the message stream is a local representation of the message source.

System Overview

A system and processes to provide a household management system with automatic email summarization are described. The system will be described with reference to FIG. 1 showing an architectural level schematic of a system in accordance with an embodiment. Because FIG. 1 is an architectural diagram, certain details are intentionally omitted to improve the clarity of the description. The discussion of FIG. 1 will be organized as follows. First, the elements of the figure will be described, followed by their interconnections. Then, the use of the elements in the system will be described in greater detail.

FIG. 1 includes a system 100. The system includes message sources 110, message management system 120, and end points 130. The message sources 110 include email account 111, email account 112, web API 113, and push notification 114. The message management system 120 includes a controller 121 and storage 122. The end points 130 include computer 131, computer 132, mobile 133, tablet 134, and TV 135. Computer 131 is coupled in communication with a display 160 showing a user interface generated by the message management system 120 in accordance with one embodiment. Additionally, user input 150 to the computer 131 is shown.

The interconnection of the elements of system 100 will now be described. The message sources 110 are coupled in communication to the message management system 120 (indicated by double-headed line with arrows at end). The different sources may arrive via different mechanisms. For example, the email accounts 111-112 may be retrieved over a network, e.g. the internet, using one or more protocols, such as IMAP, POP, ActiveSync, Exchange protocol, MAPI. The web API 113 may be accessed over another network, or the same, e.g. private network, VPN, MPLS circuit, or internet, and may be any appropriate API, e.g. Yodlee, Quicken APIs, institution-specific API. Similarly, the push notification 114 may come over a network such as the internet or over an alternative network, e.g. SMS. All of the communications may be encrypted and, as appropriate, the decryption credentials may be available to the message management system 120 directly, or may be stored in storage 122 in encrypted form until additional input from an end point 130 provides the necessary decryption information, e.g. input of a decryption password from a user on an end point. Additionally a variety of authentication techniques such as username/password, OAuth, Kerberos, and more can be used for the communications. Loosely speaking, the message sources 110 can be viewed as either "pull" or "push" sources depending on how the data reached the message management system 120. For example, email account 111 might be accessed via IMAP over SSL in a pull fashion, e.g. controller 121 causes the email account 111 to be polled periodically and new messages retrieved. In contrast, email account 112 might be accessed via ActiveSync in a push fashion, e.g. the email account 112 notifies the controller 121 when new messages are available, optionally pushing them to the controller 121.

Controller 121 and storage 122 can be composed of one or more computers and computer systems coupled in communication with one another. They can also be one or more virtual computing and/or storage resources. For example, controller 121 may be an Amazon EC2 instance and the storage 122 an Amazon S3 storage. Other computing-as-service platforms such as Force.com from Salesforce, Rackspace, or Heroku could be used rather than implementing the message management system 120 on direct physical computers or traditional virtual machines. Communications between the potentially geographically distributed computing and storage resources comprising the message management system 120 are not shown.

The end points 130 are similarly coupled in communication to the message management system 120 (indicated by double-headed line with arrows at end). This communication is generally over a network such as the internet, inclusive of the mobile internet via protocols such as EDGE, 3G, 4G, LTE, Wi-Fi, and Wi-Max. The end points 130 may communicate with the message management system 120 using HTTP/HTTPS protocols and may be implemented in one embodiment using a web interface or application to enable easy support of a range of end point device types. The mobile 133 can be any mobile device with suitable data capabilities and a user interface, e.g. iPhone, Android phone, Windows phone, Blackberry. The tablet 134 can be any tablet computing device, e.g. iPad, iPod Touch, Android tablet, Blackberry tablet. The TV 135 can be a TV with built in web support, for example Boxee, Plex or Google TV built in, or can be a TV in conjunction with an additional device (not shown and often referred to as a set-top box) such as a Google TV, Boxee, Plex, Apple TV, or the like. According to some embodiments, the end points 130 are any web-enabled device supporting reasonable full HTML rendering, and the feature set available on a device may be limited depending on the HTML rendering capabilities. In other embodiments, a custom, or native, user interface is prepared for the device, e.g. a device with a more limited web browser but a native widget set might receive a custom application. Similarly, some recent mobile devices, tablet devices, and TVs support an "application store" concept and custom applications could be targeted at such embodiments. In certain situations, the environment may be executing remotely and rendered on the TV, e.g. cable headed computers execute the application and cause the display to be rendered and process user inputs passed back over the system. The display 160 is coupled in communication with the computer 131 and the computer 131 is capable of receiving user input 150, e.g. via keyboard, mouse, track-pad, touch gestures (optionally on display 160).

The communication is often bidirectional with the end points 130 directly making requests to the message management system 120 and the message management system 120 directly making requests to the message sources 110.

Figure 2:
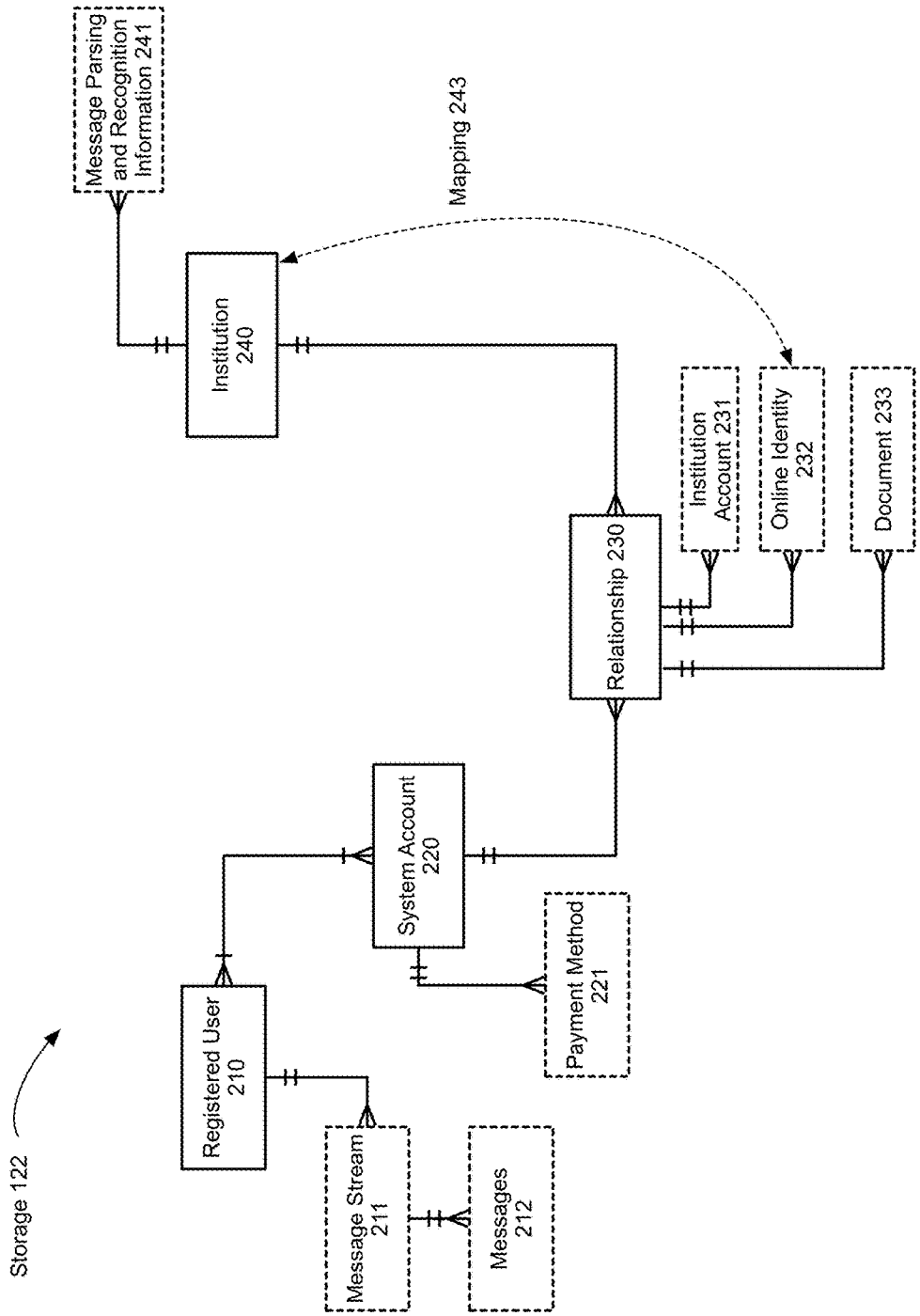
FIG. 2 shows a high level view of the data model of a system in accordance with an embodiment.

Having described the elements of FIG. 1 and their interconnections, the system will be described in greater detail in conjunction with FIG. 2, showing a high level view of the data model of a system in accordance with an embodiment.

FIG. 2 shows the relationship between registered users 210, system accounts 220, relationships 230, and institutions 240. The lines between these boxes, together with the notations at the line ends, describe the cardinality of the relationships, e.g. each registered user 210 is related to one or more system accounts 220; each system account 220 is associated with many relationships 230, but each relationship 230 is associated with exactly one system account 220. The singular and the plural are used interchangeably in discussing the elements of FIG. 2 for clarity to better focus on describing the data model which the diagram clearly describes. Dotted boxes are used to highlight additional types of associated data in the data model, e.g. message streams 211, messages 212, payment methods 221, institution accounts 231, online identities 232, documents 233, and message parsing and recognition information 241. Additionally, a mapping 243 is maintained between online identities 232 and institutions 240.

FIG. 2 is only one possible data model used by an embodiment; other data models may be used. It should be understood that the data model in FIG. 2 can be implemented in one or more databases, object relational mapping (ORM) systems, and/or any other appropriate data storage. If a SQL-style database is used, each box loosely corresponds to a table with rows of the tables containing the appropriate contents. For example, the registered users 210 could be stored as a table with one row per registered user, and an intermediate table would be used to connect the registered user table with the system accounts table to support the many-to-many relationship. In other data storage approaches, intermediate tables might not be required, and for that reason such intermediate, or join tables, are omitted from the data model of FIG. 2. The data and data model of FIG. 2 can be stored in the storage 122 and managed by the controller 121.

The storage 122 includes both institution data and user data. The institution data can include email domain names and addresses (institutional whitelist), as well as a collection of rules used to analyze emails originating from that institution. The user data can include a list of business relationships associated with each system account. Each relationship 230 can include the name of the institution, a list of institution accounts 231 that the registered users associated with that system account have established with that institution, online identities 232, and documents 233. In this embodiment, payment methods 221 can be associated with system accounts 220. This can facilitate easier bill payment, e.g. you usually pay your phone bill with your Bank X Credit Card.

Additionally, the information about institutions 240 can include information to detect when an institution is sending emails on behalf of another institution with whom a registered user has a business relationship. Example #1: Schwab and other brokerages use a service to send out certain proxy materials. Emails come from id@proxyvote.com. Emails received from proxyvote.com can be associated with the original institution (in this case Schwab) and processed as such. Ultimately, actions can be proposed and/or taken with respect to these email, helping manage that user's household. Example #2: Bank of America offers a service called e-bills. Users of the service receive notices from Bank of America when their bills come due. These notices can be associated back to the appropriate billing institution to make sense to the end user. Such linkages can use a mixture of account information from the proxied emails, as well as optional manual corrections and/or adjustments by registered users.

Returning to the description of the system 100, we will focus on the initial setup and first use of the example Doe household of John, Jane and their college aged child, Sarah to motivate the operation of the system. A household member, Jane, connects to the system 100 via an end point 130 such as computer 131 using a web browser, e.g. Chrome, Firefox, Internet Explorer, or Safari, and becomes a registered user. Once registered, Jane establishes the Doe Family system account. This information is stored by the controller 121 in the storage 122. Next, Jane provides login information for one message source 110, e.g. her personal GMail email account, email account 111. The controller 121 can then access the email account 111 and begin to automatically identify the household's institution accounts, discussed in greater detail below, and create a dashboard for the household. Later, John can become a registered user and associate his message streams, e.g. email accounts, with the Doe Family system account. Additionally, the parents can create a second system account for their college aged child, Sarah, e.g. "Sarah's Accounts," which both they and she can monitor.

Throughout this example, computer 131 will be used as the endpoint 130 and the users can view the output of the system on the display 160 and can interact with system by providing user input 150 to the computer 131. That user input 150 may be communicated by the computer 131 to the message management system 120 to eventually cause an update to the display 160.

As shown in FIG. 2, the contents of the messages can be stored in the message stream 211 associated with a specific registered user 210. This provides the system account, or Doe Family in this example, access to the messages without requiring sharing, among household members, of passwords or access credentials.

The specific display settings can be varied in different embodiments. It is valuable to have default display settings for different message types and/or institution type that can then be further customized by users. The display settings serve to limit clutter and thus better manage users' attention budgets. If only Jane is interested in promotions and coupons that she signed up for, cluttering the Doe Family user interface for John with those promotions would not be helpful. In some embodiments, the settings may also serve a security function.

For "pull" oriented message sources 110, the message management system 120 may periodically access the message sources 110 to obtain new information. The polling rate may be set automatically by the system and, in some instances, may be further customized by registered users, e.g. check my email every 15 minutes. During the pull process, relevant messages are imported into the message stream 211 for that registered user 210. See below for further discussion of email processing. For "push" oriented message sources 110, the message management system 120 can respond to push notifications by storing relevant messages into the message stream.

The message management system 120 processes the message streams 211 for a system account 220 to create an email summary that can be viewed on the end points 130.

The architecture of system 100 and the components and mechanisms through which it affords an easy way to provide a household management system with automatic email summarization is described. Additional aspects of the system will be described in greater detail with reference to the sample user interface screens and process flow diagrams in the subsequent figures.

User Interface

The system, in accordance with an embodiment, will be discussed with reference to FIGS. 3-11 showing the user interface of one embodiment. These user interfaces could be displayed on the display 160 coupled to computer 131 or other displays associated with other end points 130.

Figure 3:
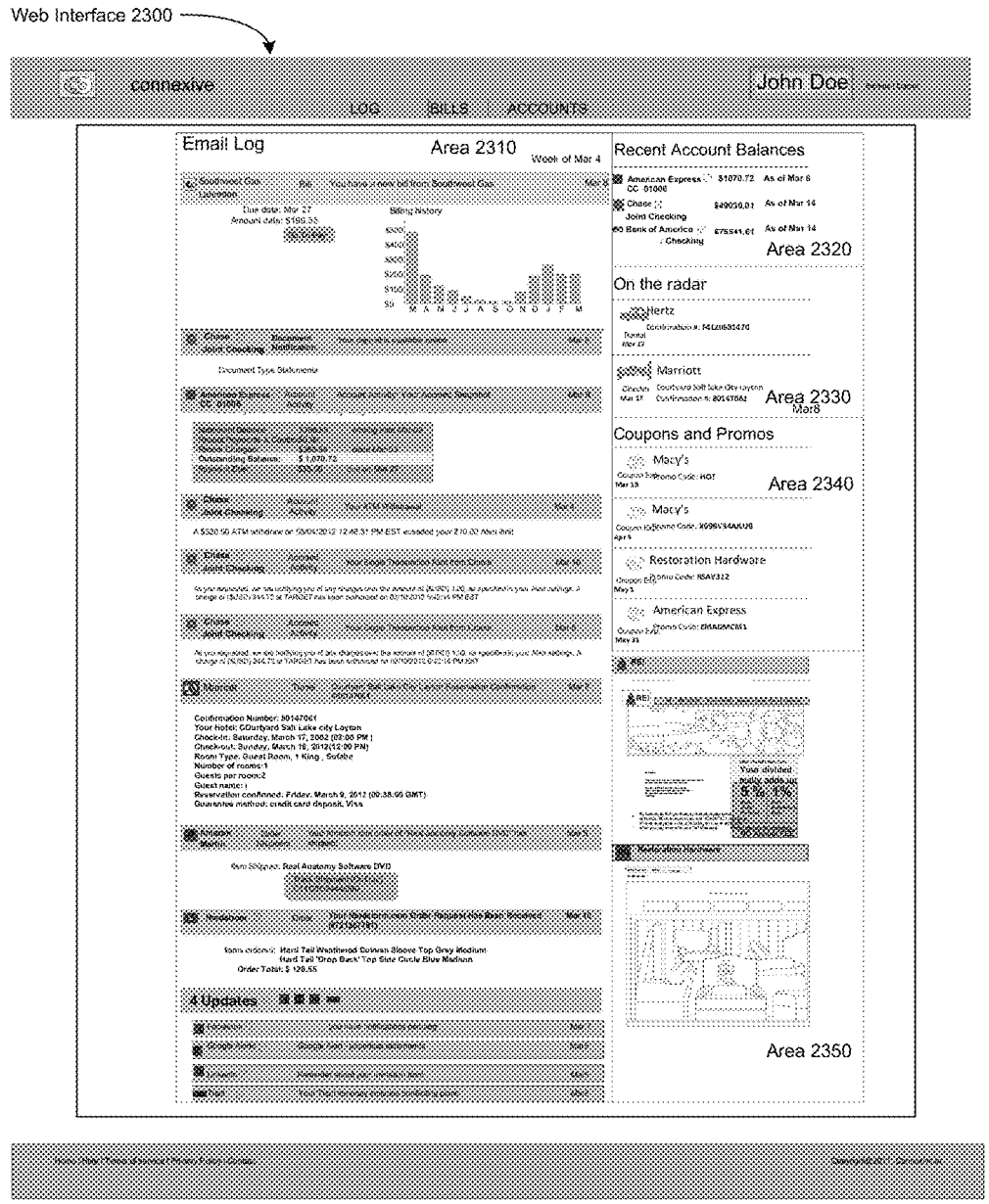
FIG. 3 shows a user interface for an embodiment.

FIG. 3 shows a user interface for one embodiment of the system, specifically, web interface 2300 (for simplicity, shown without much of the browser or operating system user interface elements). This web interface 2300 shows a dashboard view with registered user John logged in to the Doe Family system account. The user interface has been divided into several regions to provide a good summary of not just recent messages but also contents extracted from earlier messages that may be useful to the end user in the near future. The features and functionalities of the web interface 2300 and the various areas 2310-2350 will be described in greater detail in connection with FIGS. 4-11.

Figure 4:
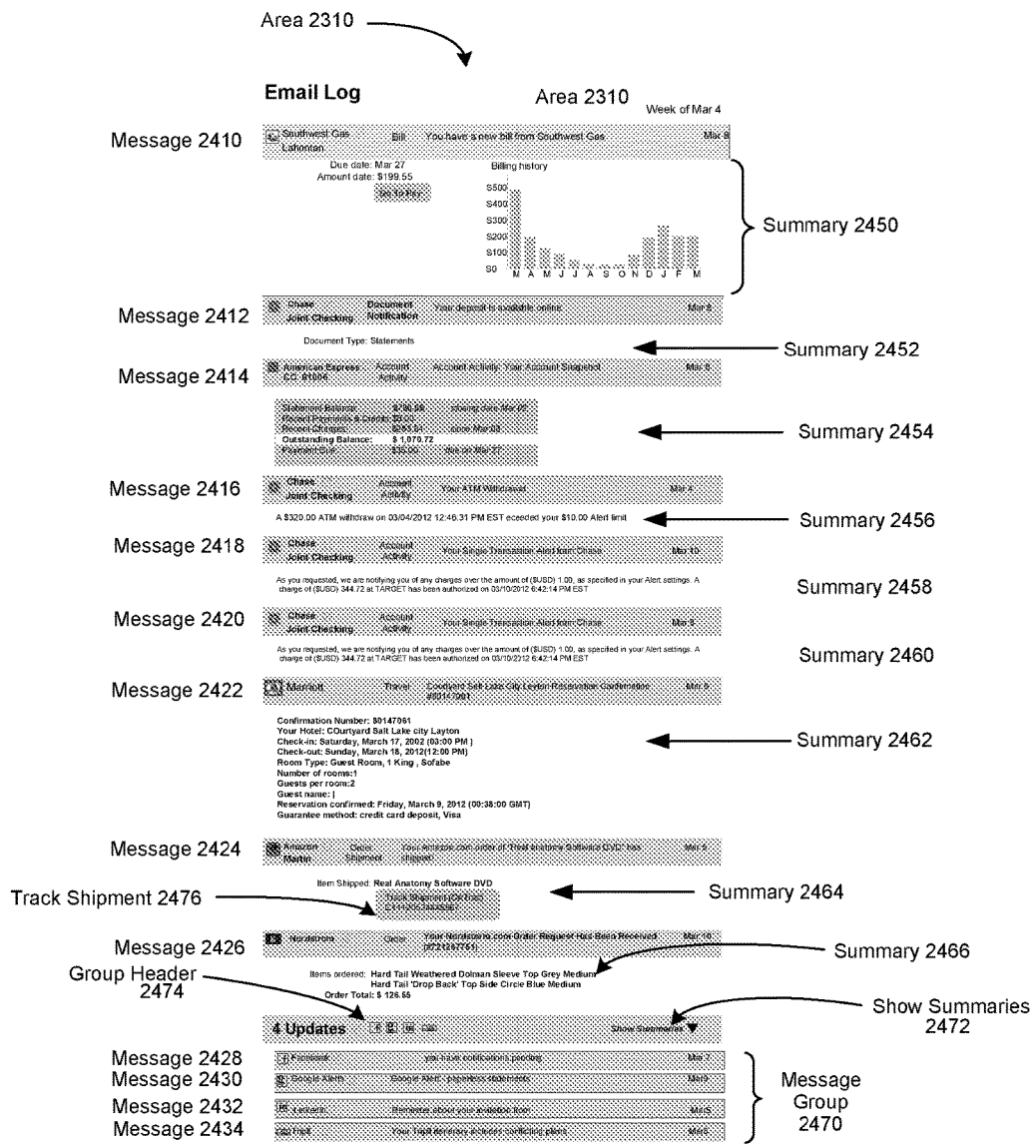
FIG. 4 shows a user interface for an embodiment in email log view.

FIG. 4 shows a user interface for an embodiment. Specifically, the Email Log or area 2310 of FIG. 3 is shown in greater detail. Notably, this user interface organizes information in a way that differs from existing email applications in two significant ways.

Firstly, in FIG. 4, recent messages are summarized in either a weekly summary form or a daily summary form instead of simply being listed in reverse chronological order based on the time stamp of individual messages. Weekly summarization is preferred in one embodiment for system accounts that receive relatively few messages whereas daily summarization can be used for system accounts with higher message counts. For the selected time period (i.e. either daily or weekly), messages are grouped by a message type attribute such that notices regarding bills and other important documents (such as message 2410 and message 2412 in FIG. 4 for example) can figure more prominently than routine updates from social networks and other web applications. Another advantage of this grouping is that it minimizes the amount of context switching on the part of the user when rapidly reviewing a large number of messages. Consider for example the sequence of account activity alerts (messages 2414-20) in FIG. 4. All these messages are related to a debit, credit or balance of one of the Doe household's financial accounts and are best reviewed in a single sequence.

Secondly, for the most important types of messages, the key elements of the message are extracted and presented in the form of a message summary immediately below the message header. This summarization method is beneficial as it enables the user to review a large number of messages in a very short period of time without having to click and scroll through individual messages. In one embodiment, the sophisticated summary extraction method described herein can be used. This approach is in contrast with existing summarization techniques that simply append the first few words of the message body at the end of the message subject whenever space allows.

The nature of the message summary can vary depending on the type of message and the specific data that is available. For example, summary 2454 and summary 2462 in FIG. 4 both contain an entire table (and associated formatting information) that were extracted from the HTML structure of their respective messages. Other summaries are comprised of text strings in which the most important words were highlighted for additional emphasis (e.g. summary 2456, summary 2458 and summary 2460). Summaries can also be comprised of a collection of discrete text strings extracted from the message body and shown in the form of attribute-value pairs. Examples can be found in summary 2450, summary 2464 and summary 2466. Additionally, summaries can contain action buttons such as the track shipment 2476 button (see FIG. 4). In some embodiments, such action buttons can be linked to URLs contained in the body of the original email. In some embodiments, such URLs can be analyzed and processed to protect the user from malicious content, e.g. removal of phishing links, in which case a special symbol can be attached to the action button to notify to the end user that it is safe to click on that button. In some embodiments, the action button or corresponding URL may be created by the system (e.g. if the original email does not have a tracking button or URL, but a UPS tracking number can be detected, then a track button can be added that is linked to an appropriate URL for UPS).

Another important feature of one embodiment is the grouping of messages with lesser value in order to minimize visual clutter. Consider for example message group 2470 in FIG. 4. This group contains four messages (message 2428, message 2430, message 2432 and message 2434) of similar type: routine account updates from online applications. In some embodiments, inclusion or exclusion of specific types of messages, or messages from specific institutions, can be determined by user provided preferences. For these messages, the system can prepare a summary, but not show it by default. The group header 2474 shown in FIG. 4 informs the user about the number of messages in the group as well as the type of messages involved (e.g. updates, newsletters, feedback requests, etc.). The group header also contains a button, for example the show summaries 2472 button to enable an interested user to display the summaries of all the messages in the group with a single click. In some embodiments, this email log area 2310 supports infinite scrolling.

Figure 5:
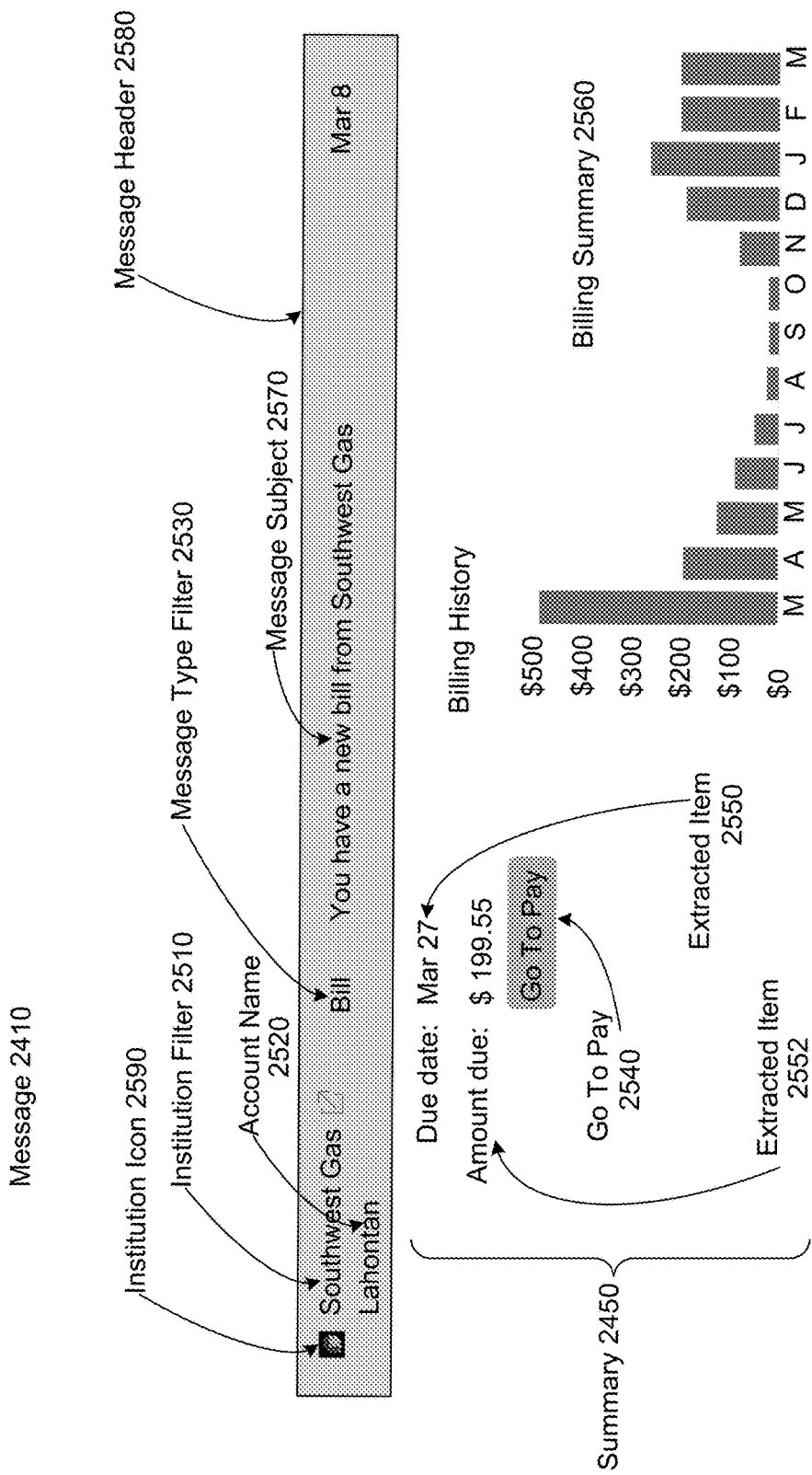
FIG. 5 shows a user interface for an embodiment in message summary view.

We now turn to FIG. 5 for a more detailed discussion of the presentation of individual messages under one embodiment. Generally, messages are displayed as message header and message summary. In this example, the message header is a shaded box located above the message summary, e.g. message header 2580. In this embodiment, the message header contains the name of the institution that the message originated from (see institution filter 2510 in FIG. 5), an optional account name field (e.g. account name 2520), a message type indicator (e.g. message type filter 2530) and a message subject (e.g. message subject 2570). For weekly summaries, a message date is shown according to some embodiments. In message header 2580, the institution filter 2510 shows the name of the sending institution. The institution filter 2510 is derived by the system based on the Message Parsing and Recognition Information 241 (see FIG. 2) such that messages emanating from a given institution can be associated both visually and functionally with that institution. This is in contrast with existing email programs that generally make use of the from-name field in the email headers to display the name of the message originator leading to non-descript and confusing strings such "customer service" or "billing center" that do not properly identify the sending institution. The institution filter 2510 serves the dual purpose of identifying the sending institution and enabling filtering of the Email Log area 2310 by the corresponding institution. In some embodiments, a user can click on institution filter 2510 and cause the email log area 2310 to be refreshed such that only messages from that institution are now displayed in that area (in this example, only messages received from Southwest Gas would be shown). Finally, in some embodiments, an institution icon 2590 for the sending institution is included in the message header 2580 proximate to institution filter 2510. In the shown embodiment, such an icon is the Favicon that institutions provide on their web site for display in browser windows.

In some embodiments, the message type filter 2530 performs a similar filtering function. For example, a user can click on message type filter 2530 to cause the email log area 2310 to be refreshed such that only messages belonging to the type group that includes (in this example) "bill" would be displayed.

In some embodiments, the account name 2520 also performs a similar function such that users have the ability of filtering their messages not only by a given institution but also by a given account at that institution. In the shown embodiment, a user clicking on account name 2520 would result in the email log area 2310 begin refreshed with only messages pertaining to the "Lahontan" account that the Doe family has with Southwest Gas and would exclude messages originating from Southwest Gas but pertaining to other accounts that the family may also have or messages that are not associated with a specific account. The content of the account name 2520 is by default an abbreviated version of the account number that is extracted from the corresponding email when such an account number is present. In some embodiments, the user has the option of entering a mapping of such extracted account names or numbers to a familiar identifier in order to enhance the readability of the email log. A more detailed description of message filtering is presented in a subsequent section in the context of the description of FIGS. 6-8.

We now describe the contents of summary 2450 as an example of a summary containing hybrid data, i.e. a combination of (i) data that is contained in the message being summarized, (ii) data that is contained in other messages within the same system account 220, (iii) data that was entered by a user, and/or (iv) data that is inferred by the message management system 120. Firstly, this summary 2450 contains some data fields that were extracted from the email directly. See, for example, the lines pertaining to extracted item 2550 and extracted item 2552, respectively.

In some embodiments, information may also be included in summary 2450 such as an indication that the corresponding account is set up for automatic payments (i.e. "auto pay") or the payment method that is normally used to make this payment, the amount and date of last payment, etc. In some embodiments, the amount of the last payment can be extracted from, for example, an account activity alert received from a financial institution describing a payment to Southwest Gas using a credit card or other account. The go to pay 2540 button provides an example of summary information that is derived by the system. If the user has received a bill that is not subject to automatic payments, then it is likely that the user is going to want to make this payment and it is therefore useful to provide a link that can serve to initiate this payment action. The URL associated with go to pay 2540 button is also generated by the system 120 and may be tied to the payment method associated with account name 2520 if it is known. In some embodiments, a Go To Review button is appended to summaries of bills that are subject to auto-pay, which directs the user to the appropriate web site to review the bill even if no action is required to insure proper payment. The billing summary 2560 is an example of the use of information extracted from prior messages received from the same institution and corresponding to the same account (i.e. Lahontan) in order the enhance a summary. In this example, the last twelve months of billing amount due is shown as a bar graph. In some embodiments, other such supporting data can include data extracted from an Explanation of Benefits (e.g. the amount that a patient is responsible for) along side the summary of a medical bill. In other words, the goal is to provide any information that can help the user make sense and make decisions based on the information contained in a given summary.

Figure 6:
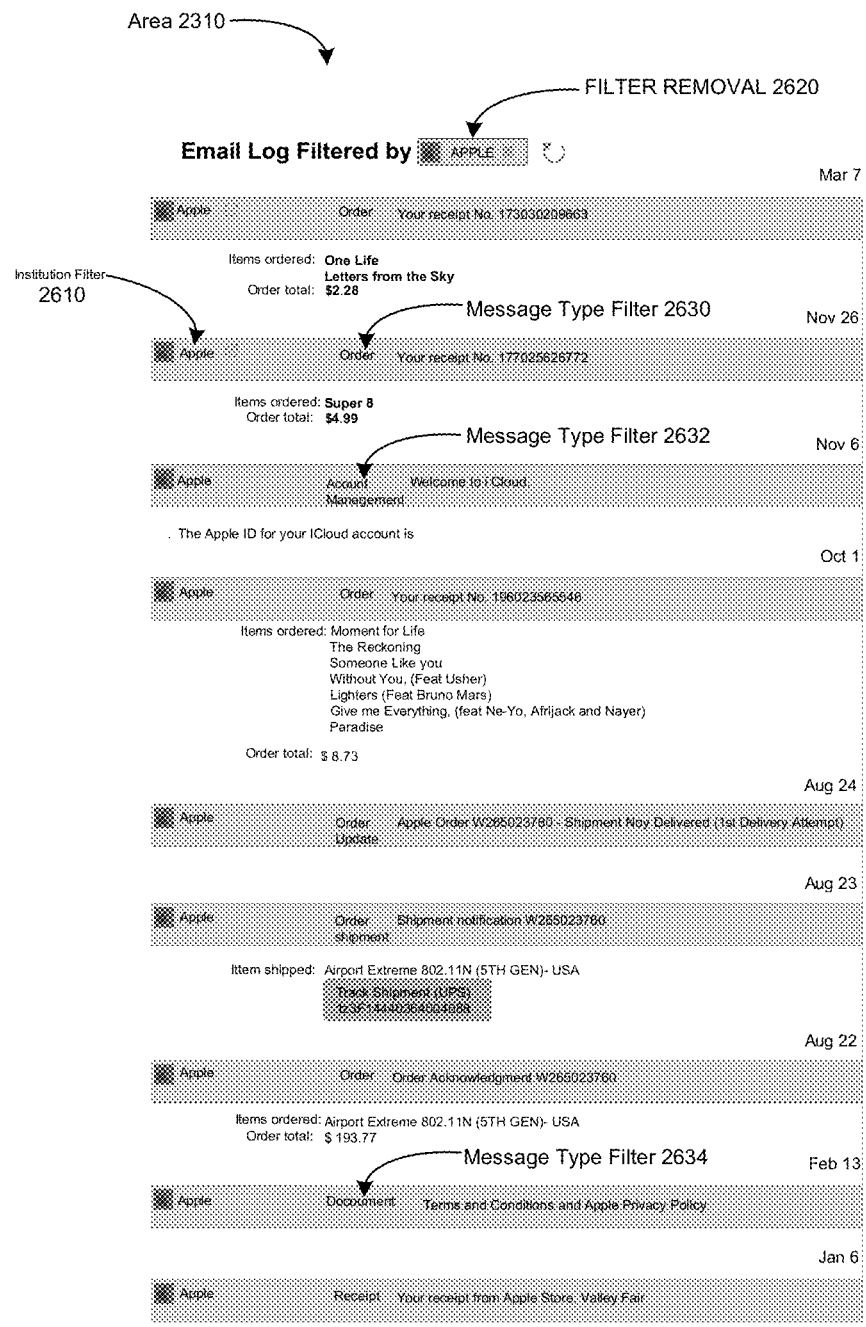
FIG. 6 shows a user interface for an embodiment in email filtered by institution view.
Figure 8:
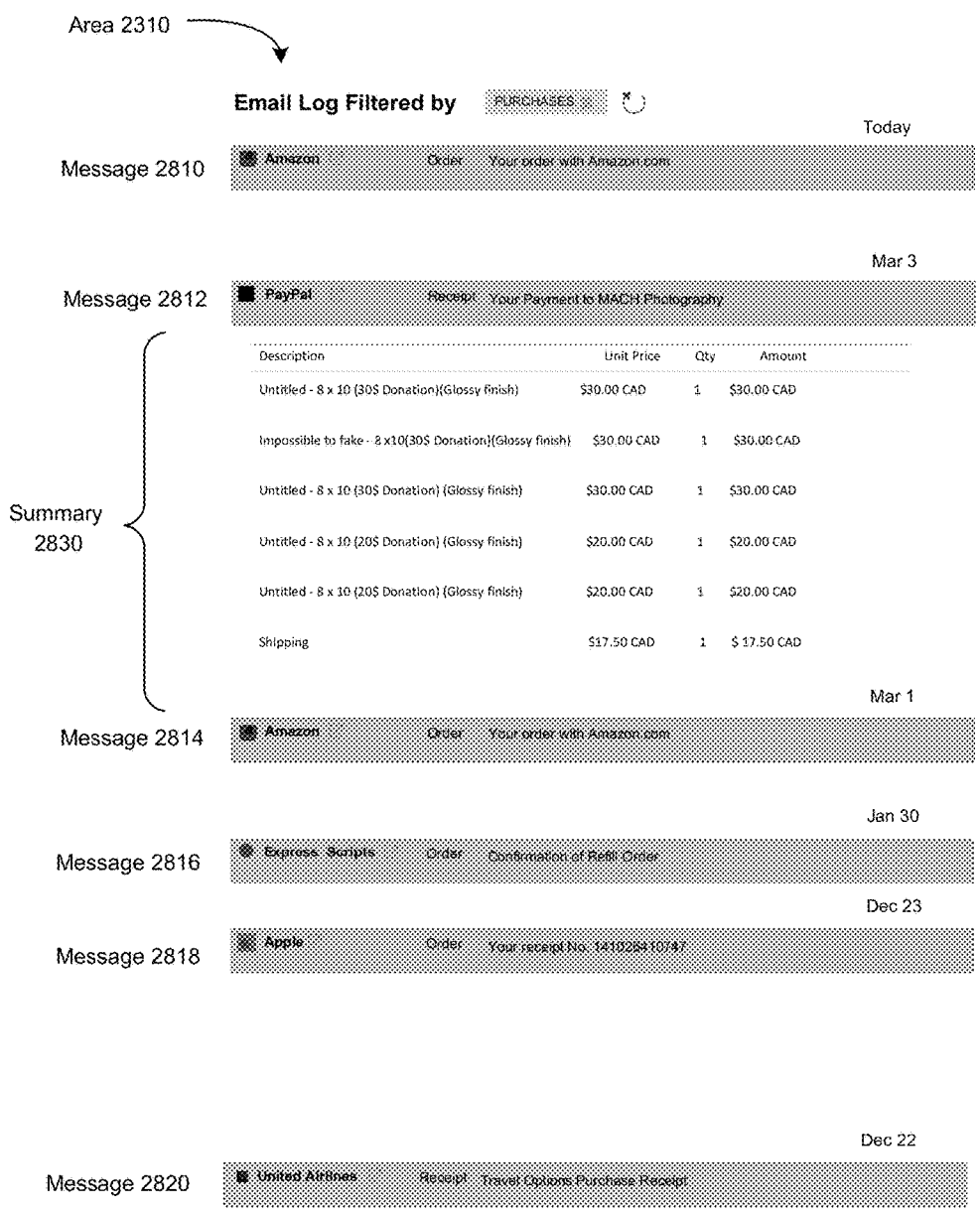
FIG. 8 shows a user interface for an embodiment in email log filtered by purchases view.

FIGS. 6-8 serve to illustrate the function of the message filters in greater detail. FIG. 6 shows an example produced by one embodiment in which the email log of area 2310 has been filtered by one institution filter 2610 such that only messages from Apple are visible in the email log area. In some embodiment, a filter removal 2620 button is included near the top of the area to enable the user to quickly undo the effect of the filter and restore the original view. Additionally, in some embodiments, the email log area can be further filtered to only include messages of a certain message type group. In the embodiment shown, message type filters 2630-2634 could be user to further restrict the view to, for example, only "orders" from "Apple" or only "documents" (which would include receipts) from "Apple". In this case, according to one embodiment, a second filter removal button would be included in the interface, proximate to filter removal 2620, which could be used to undo the effect of the message type filter. In some embodiments, the filters can be removed in arbitrary order. For example, consider the following sequence. If institution filter 2610 is applied first (only messages from "Apple"), followed by message type filter 2630 (only "orders"), followed by a click on filter removal 2620 (i.e. remove "Apple" filter), then the resulting view would include all messages relating to "orders" from any institution.

FIG. 7 shows an example of an email log filtered by "newsletters" (see message type filter 2720 in FIG. 7). Under some embodiments, this filtering action also causes the messages in the filtered view to be displayed along with their summary (see for example messages 2710-14) as opposed to their default view as a message group similar to message group 2470 in FIG. 4 with only message subjects shown. This is beneficial as it allows review of a number of newsletters from multiple senders to be performed without clicking and scrolling through individual messages.

FIG. 8 provides an example of a hybrid filter, which aggregates messages of a number of different types when these messages are related. In the shown embodiment, a user clicking on a button labeled "purchases" located anywhere in the web interface 2300 (button not shown) results in the email log being filtered to show only messages related to purchases. This may include (i) order confirmations for all orders (e.g. orders for physical goods, digital orders, ticket orders, recurring orders, and subscriptions (see for example messages 2810, 2814, 2816 and 2818 in FIG. 8)) but exclude order updates such as shipping confirmations, and (ii) documents of the receipt type (e.g. message 2812 and message 2820). In the shown embodiment, the contents of message summary 2830 are extracted from an attachment to the email, in this case an email from PayPal, as opposed to the body of that same email. This is beneficial as it enables a user to review purchases without having to click through to the message and then open the attachment—often requiring a separate application, window, and/or viewer to be launched.

Figure 9:
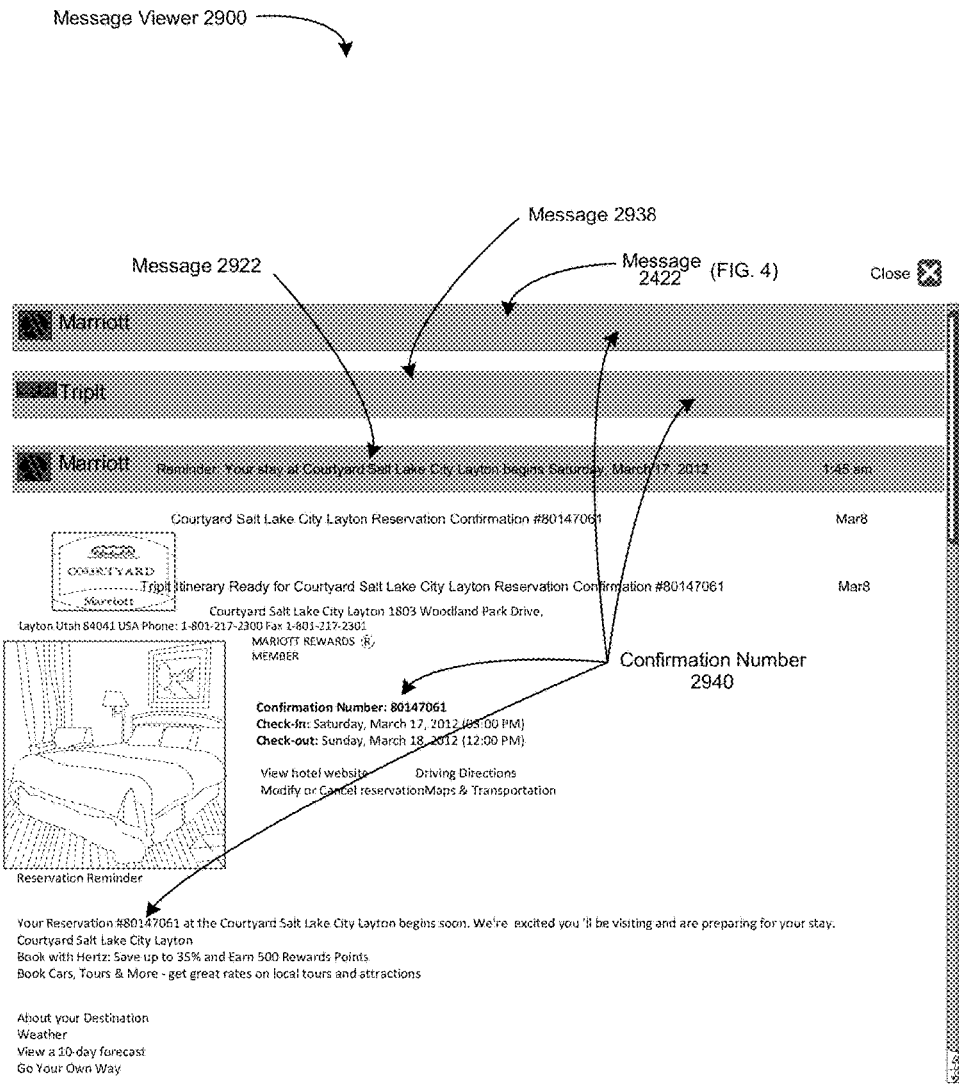
FIG. 9 shows a user interface for an embodiment in message viewing view.
Figure 10:
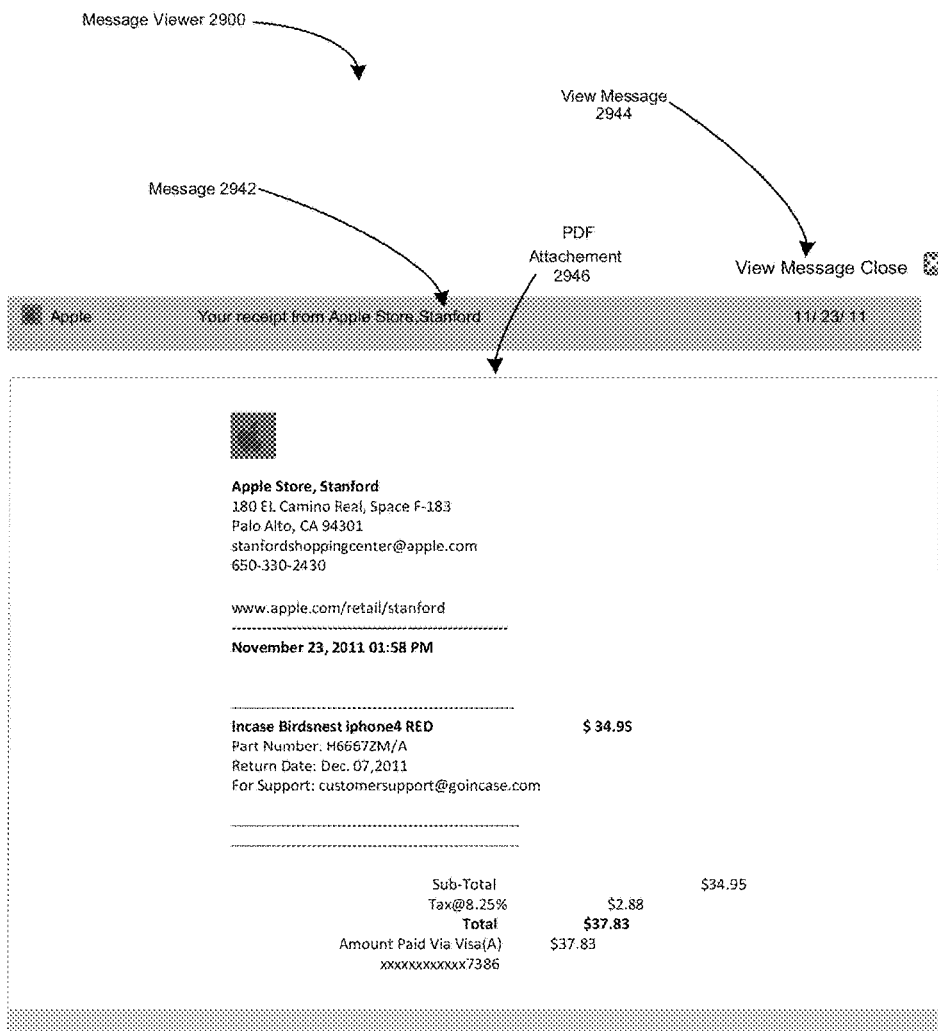
FIG. 10 shows a user interface for an embodiment in message attachment viewing view.

In addition to the message summaries described thus far, the web interface 2300 also enables users to view messages with a message viewer 2900 shown in FIG. 9 and FIG. 10. In some embodiments, the message viewer supports threading of messages through extracted data, e.g. a confirmation number, an order number, a tracking number, a customer number, or a ticket number, etc. In the shown embodiment (see FIG. 9), confirmation number 2940 is used to thread message 2922 with two earlier messages that are related. For example, message 2938 contains confirmation number 2940 (i.e. #80147061) and is therefore linked even though it was received from a different institution. Also, message 2422 (originally shown in FIG. 4), which contains the initial reservation, is included in the thread. This is in contrast with other uses of message threading, found in popular email clients such as Gmail and Outlook. Such programs aim to thread messages in order to make conversations intelligible by the end users, by grouping messages that can be identified as back and forth sequential replies among a common set of individuals. The common thread among such messages is the subject line, the list of senders and recipients, etc. The embodiment shown in FIG. 9 makes use of threading in order to help users make sense of their online purchases, travel arrangements, banking transactions, etc. This is accomplished by grouping messages that are related to a common event such a purchase, trip or financial transaction, etc. The common thread between those messages is more contextual; a transaction number, a confirmation number, a hotel name, an account number, tracking number, etc.

Another feature of message viewer 2900 is shown in FIG. 10. In some embodiments, an attachment to a message can be displayed in lieu of the message body, when the system deems that the message serves no purpose other than to carry the attachment. In some embodiments, such determination can be made based on the message type or optional tags as described in a subsequent section. In the shown embodiment, a user clicking on the subject of a message 2942, within the email log area 2310 (not shown), which message carries a PDF attachment 2946, results in the message viewer displaying the attachment in lieu of the message, as shown in FIG. 10. The user can switch to the message body view by clicking on the view message 2944 button.

Continuing to discuss the regions in the web interface 2300, we turn to three regions that do not display individual messages but rather display time sensitive contents that are either extracted or inferred from messages.

Area 2320 (see FIG. 3) is for account balances. Balances for bank accounts, credit cards, loan accounts and rewards accounts can be aggregated in this region. In some embodiments, a given balance is shown until a more recent amount is received or the data shown is more than a pre-determined number of days out of date. In some embodiments, items to track for each type of account may include:

Bank: account balance, source and date of last update
Credit card: current account balance, source and date of last update; last statement balance, date of last statement; current minimum payment due, due date
Loan: account balance, date of last payment, amount and date of next payment
Rewards: account balance, source and date of last update, expiry date
Credits: store credits and expiration dates The range of information available will vary depending on the message sources 110. For example, if the reward messages from United Airlines do not include a points expiration date, then that will be omitted (or it can be extracted from the United Airlines web site in some embodiments). In contrast, if American Airlines or Best Buy includes that information, then that information can be included. Additionally, since this information is obtained from reviewing message sources 110, registered users may desire to opt in to additional messages from institutions they interact with to improve the quality of information available to the system.

In some instances, the user may provide the credentials for accessing an institution's data directly, e.g. via a web API or other API. In such an instance, the collected information might be more frequently updated without the need to receive a message.

Continuing to the next region, the region labeled "On the radar" (area 2330 in FIG. 3) contains a list of upcoming events that may require the user to access related messages. The word "event" in this context refers to any future occurrence for which relevant information exists in the message stream of a given system account 220. For example, if a user is expecting the installation of a new utility service to occur on a certain date, he may want to access all the emails that are pertinent to this installation just prior to the installation date. Other examples of events include but are not limited to:

Restaurant reservations,
Tickets for a movie or other entertainment venue,
Upcoming expiry of reward points,
Upcoming expiry of a purchased special offer (e.g. from Groupon)
Check in for a flight or a hotel,
Doctor's appointment,
A meeting or other social gathering,
Reservations for car or truck rental, and
Miscellaneous equipment rental or local services.

Each of the above can be linked to a number of different messages referencing the initial booking and any subsequent updates or changes to the original plans.

Figure 11:
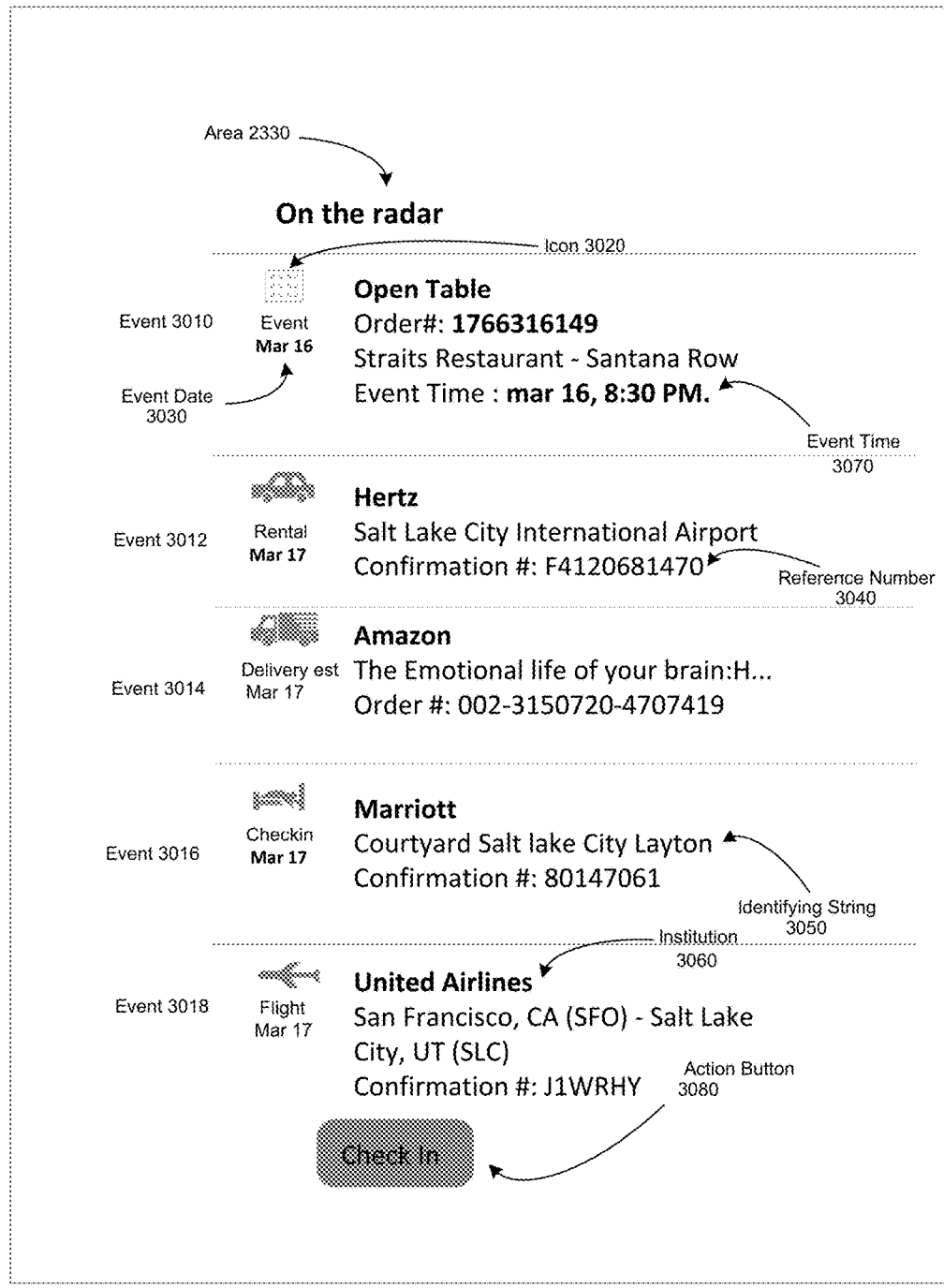
FIG. 11 shows a user interface for an embodiment in anticipated event view.

FIG. 11 shows the user interface for the radar section for an embodiment. Specifically, a radar area 2330 of FIG. 3 is shown in greater detail. In order to provide a more comprehensive description, we show this depiction of area 2330 with a larger number of events of greater diversity. For each event (events 3010-3018), an icon is used to identify the type of event being referenced. Icon 3020 is the generic icon used when a more specific icon is not defined for the type of the given event. For some embodiments, a date is shown proximate to the icon to indicate the date of the event if it is known (e.g. event date 3030). Additionally, some embodiments may include an institution identifier such as institution 3060. In one embodiment, each event is associated with a reference number such as reference number 3040. The reference number can be an order number, a confirmation number, a tracking number or any other number or data string that is used to thread together several messages that are related to the event. This serves to illustrate the dual purpose of extracted items: (i) to guide the logic of the message management system 120 (such as threading of related messages discussed earlier), and (ii) the presentation of critical data contained in selected messages to the end user. Specific techniques for item extraction are discussed in a further section.

The reference number is shown so that the user may reference it without opening any of the related messages. Additionally, in some embodiments, a string is included in the event description to help the user differentiate this particular event from other similar events. This is useful for example if a user is expecting multiple deliveries from the same retailer in the near future or if a user has made several reservations with the same service provider. Identifying string 3050 for example could help distinguish a reservation at the Courtyard by Marriott hotel near Salt Lake City from another reservation also made at a Marriott hotel for the following night in Ogden, Utah. Additionally, in the shown embodiment, extracted items can be included in the event description. See for example, event time 3070, in FIG. 11. In some embodiments, action button 3080 enables the user to initiate the online checking process again without opening any messages. Other embodiments support other types of action buttons appropriate to specific events.

In the next region labeled "Coupons & Promotions" (Area 2340 in FIG. 3), according to one embodiment, promotion codes extracted from promotional emails are included in chronological order of expiration dates (i.e. the soonest to expire are shown first). In some embodiments, coupons can be displayed in this area until their expiration date, or for a pre-determined period from the time they are received, or until dismissed by the user.

Finally, in some embodiments, the next region, area 2350 can include advertising from the user's email stream. In the embodiment shown, promotional emails are displayed in the form of large thumbnails. The thumbnails, which depict only the top portion of the corresponding email, are large enough to enable the user to decipher the essence of the message (e.g. an offer for a new type of credit card, a summer sale, a shoe sale, etc.) without requiring the user to click and scroll through individual messages. Such thumbnails are a useful way to summarize promotional emails. In some embodiments, the area 2350 supports infinite scrolling enabling the user to easily scan a very large number of promotions in a very short amount of time. If one promotion is of interest, the whole message can be viewed, with message viewer 2900 (see FIG. 9), by clicking anywhere on the thumbnail.

In some embodiments, the operator of the message management system 120 may charge a fee to promote the advertising of certain companies. In such an embodiment, sometimes referred to as a correlated advertising, only those promotional messages from companies with a relationship with the system operator are displayed in thumbnail format in the promotions area 2350. Alternatively, the payment of a fee may result in preferential placement of a given promotion over other unsponsored messages. In some embodiments, unsponsored promotion messages are housed at the bottom of the email log area 2310 in the form of a group header similar to group header 2472 (see FIG. 4) but without enumerating individual message subjects in the area immediately below it. In some embodiments, the decision to include a coupon in area 2340 and/or a large thumbnail in area 2350 could be based on user preferences (such preferences being expressed as either an inclusion list (i.e. only show me coupons from so and so) or an exclusion list (i.e. don't show me coupons from these retailers), or a combination of user preferences and corporate sponsorship.

The web interface 2300 as shown can be displayed on a laptop or desktop computer, e.g. computer 131. Other configurations of the interface may be used in other computing environments such as mobile phones, tablets, or TVs. Each region of the web interface 2300 can, for example, be a task or activity that could be separately touched to bring up the appropriate contents as the primary view. Additionally, the ordering of the regions of the web interface 2300 may be user customizable and/or defined by the system operator.

This discussion of highlighted several concepts underlying the system. Multiple messages from multiple message sources are obtained by the system. The system analyzes the messages and based on the type of message determines a mechanism for summarizing the message and presenting multiple messages in summary form to the end user.

Message Summarization

Figure 12:
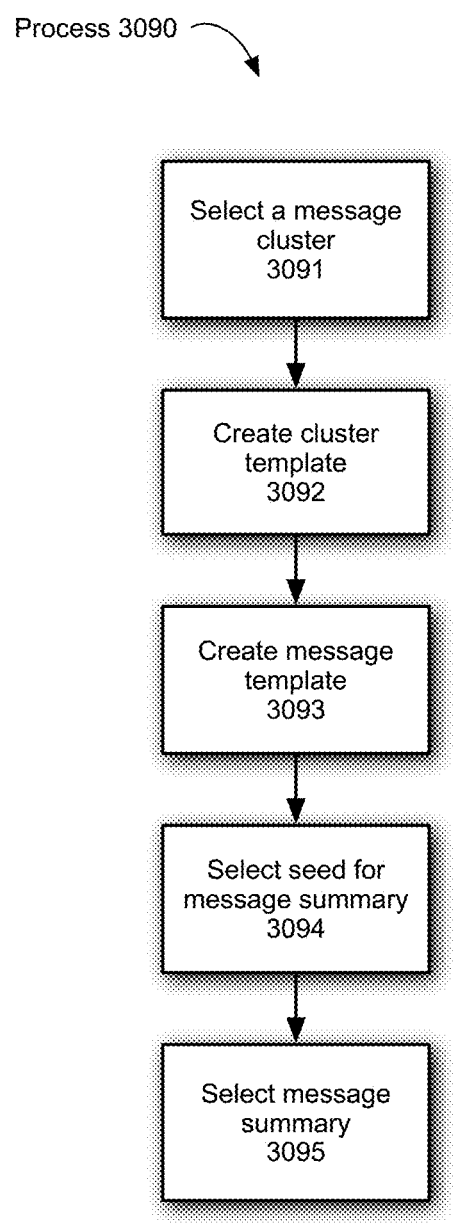
FIG. 12 is a process flow diagram for message summarization according to one embodiment.

FIG. 12 is a process flow diagram for message summarization according to one embodiment. FIG. 12 includes a process 3090 comprised of five steps 3091-3095. The purpose of this process is to compute a message summary for a message, e.g. a message sent by an institution 240 to a registered user 210 who is associated with a system account 220. In the following paragraphs, we will first describe each step of process 3090. Then we will further illustrate two embodiments of message summarization applied to text and HTML messages, respectively.

Step 3091 of message summarization consists of the selection of a message cluster in order to assist message summarization. A cluster is defined as a group of messages selected from the set of messages 212 and can include messages received from any institution and destined for any of the registered users. In some embodiments, clustered messages include messages from any of the system accounts 220, but are restricted to those messages sent by a single institution 240, that sent the message being summarized. In some embodiments, a rules engine can be used to identify candidate messages for clustering based on selected fields in the message headers; e.g. from-name, from-address, subject, reply-to, etc., in order to further reduce the computational complexity of cluster identification.

In some embodiments, a technique known as near duplicate detection is used in order to group messages that shared nearly identical bodies to each other—and to the message being summarized. Two messages are deemed near duplicates if they contain long common strings or characters that appear in the same order in both messages and that make up the a significant portion of each message. The Jaro-Winkler distance, or the edit distance, can be used as a measure of near-duplicates. Other appropriate implementations of near-duplicate detection are used by other embodiments. In some embodiments, a segmentation method such as Rabin-Karp fingerprinting or N-grams is used to generate sub-strings for use in a clustering algorithm method such as K-nearest neighbor clustering, K-means clustering, fuzzy c-means clustering, quality threshold (QT) clustering or locally sensitive hashing, etc., for cluster selection. In some embodiments, an inverted index may be built for the sub-strings generated by the segmentation method described above in order to improve the computational efficiency of clustering. In some embodiments, more robust and computationally expensive measures of message similarity, such as Ratcliff/Obershelp pattern matching, can be used for greater accuracy of results. In some embodiments, clusters may be limited to include only messages received around the same time as the message under consideration, e.g. within a 30 or 90 day window of the date of the message. In some embodiments, the newly received message is assigned to a new cluster with a single message when no suitable clusters of near duplicate messages can be found in messages 212.

Step 3092 of process 3090 consists of the creation of a cluster template for the selected cluster. A cluster template is defined as a collection of strings that are common to all the messages in the cluster. In some embodiments, this collection is comprised of space-separated sub-strings roughly corresponding to words in the message text. In some embodiments, the collection of strings is ordered such that the strings in the template appear in the same order as they appear in each of the clustered messages.

Step 3093 of process 3090 consists of the creation of a message template for the specific message being summarized. A message template is defined as cluster template that has been augmented with those strings that are not part of the cluster template but are contained in the message being summarized. This may include contents that are either unique to that message or that are contained in only a subset of the cluster messages (and therefore not included in the cluster template). In some embodiments, a frequency score is assigned to each string in a template, which in some embodiments is the number of message containing the string divided by the total number of messages in the cluster, such that strings that are part of the cluster template have a score of 1, and strings that only part of the message template have a score that is less than 1, with the most unique contents receiving the lowest frequency score. Other embodiments can use other scoring mechanisms. In some embodiments, the frequency score of a given string can be further biased (either increased or decreased) based on whether that string contains an extracted item (or extracted items) that are of particular interest given the context (or type) of the message, in order to obtain the final score of that string. Extracted items will be described in greater detail in later sections both in the context of message summarization examples and message acquisition and processing. In some embodiments, the message template is an ordered set of strings.

Step 3094 of process 3090 consists of the selection of the seed for the message summary, comprised of a set of one or more strings from the message template. In some embodiments, a summary seed is selected based on the final scores of the strings in the message template. In some embodiments, the seed is comprised of the string with the lowest score, whereas in other embodiments, the seed may be comprised of a pre-determined number of strings with the lowest scores or of all those strings with a score less than a pre-determined threshold.

Finally, step 3095 of process 3090 consists of the selection of the message summary. In some embodiments, message summary selection is based on a text only version of the message, in which a message is stripped of all HTML and other formatting constructs, images, links, etc., such that only the text that would be visible to an end user remains. This is sometimes referred to as message text summarization. In some embodiments, the message summary is a subset of the message text that encompasses the strings contained in the summary seed. In some embodiments, the summary that is returned contains a pre-determined number of words or characters or is limited not to exceed a pre-determined number of words of characters. In some embodiments, the summary is comprised of complete sentences or paragraphs contained in the message text. In some embodiments, the number of such complete sentences or paragraphs is pre-determined. In some embodiments, segmentation methods from natural language processing such as Conditional Random Fields may be used to compute a text summary from the message seed. Finally, in some embodiments, message summary selection is based on the HTML structure of the message as well as the message template. This is sometimes referred to as HTML message summarization. In such embodiments, context is added to the seed such that the summary that is returned is a valid HTML structure, such as a table, which encompasses the contents of the message seed. For example a table cell (TD), table row element (TR), table header (TH) or table body (TBODY) must be contained in a table element (TABLE), so a seed that includes only a TD or TR element is expanded to include the entire table, or a table containing a proper subset of the table rows. In some embodiments, other segmentation methods, such as examination of font size, paragraph and sentence segmentation, HTML tags such has header (H1, H2, etc.) or paragraph (P) tags, or examination of CSS, HTML or other formatting directives, may be used to expand the seed to generate context. For example, if the seed includes a sequence of inline elements, they may be expanded to include inline neighbors in the HTML parse tree. In some embodiments, the message summary may maintain the formatting information inherent in the message. In some embodiments, a size constraint is applied for HTML constructs, based on a maximum x, y dimensions of the rendered HTML construct, using the display formatting used in the UI of FIG. 3.

Alternatively, in some embodiments, the following process can be used for summary selection. First, the message template is broken down into words. Second, words can receive an individual score. In some embodiments, words have the same score as the string they originated from such that all the words in the cluster template have a score of 1, etc. Third, a set of candidate fixed sized windows is generated which encompasses the words contained in the message seed strings. In some embodiments, such windows are defined as lists of consecutive words in the order of their appearance in the message template. For example, in some embodiments, all possible windows of exactly thirty words in length that contain at least one word from the message seed can be generated. In some embodiments, the HTML structure of the message is used in window selection such that, for each HTML node, the sequence of words contained in it forms a window. Fourth, a score can be computed for each window. In some embodiments, the window score is the sum or the average of the scores of the words contained in that window. In other embodiments, other scoring functions such as minimum or maximum score, or a combination of the above can be used. Fifth, the window with the optimal score is selected. Six, the summary is produced. In some embodiments, the summary is simply the window with optimal score. In other embodiments, such window can be augmented with adjacent words, either before or after the optimal window, so as to form complete sentences, or complete paragraphs, etc., in order to produce the final message summary. In other embodiments, the HTML structure of the message is used to generate the message summary as described above.

The preceding description has focused on email-style message summarization; however, the approach is generally applicable to any of the message sources 110. Additionally, the preceding description has been described sequentially; however, parallel, partially parallel, or out-of-order execution of the steps of process 3090 may be possible. Additionally, and notably, in some embodiments, the message clusters and corresponding cluster summaries may be pre-computed and stored in storage 122. In such embodiments, step 3091, cluster selection, consists of selecting that cluster from among the pre-computed clusters with the greatest affinity to (i.e. degree to which each message in the cluster is a near-duplicate of) the incoming message, or, alternatively, selecting a cluster whose template is compatible with the incoming message, if such a cluster can be found, and otherwise, the process 3090 can be performed in full to generate a new cluster and template. In some embodiments, affinity of a message to a cluster may be determined by string similarity measures such as edit distance, Jaro-Winkler distance, or document similarity measures such as cosine similarity coupled with an appropriate term weighting such as TF-IDF.

We now describe message summarization according to one embodiment. FIG. 13 illustrates the application of an implementation of process 3090 to message text summarization. In the shown embodiment, message 3110 is the message to summarize. Following the selection of a message cluster and corresponding cluster template, message template 3120 is created. The strings shown in bold are part of the message template and are not part of the cluster template (i.e. the cluster template, not shown, is simply the message template minus the bold strings). Strings 3130-3136 in message template 3120 are considered the most interesting content (shown in bold) because their score is less than one. The other text strings are found in all the messages in the cluster (i.e. they have a score of 1) and are therefore uninteresting for the purpose of summarization. Recall that in some embodiments, extracted items are used to modify the score of individual strings. In the shown embodiment, extracted item 3140 (transaction amount) raises the importance of string 3130 relative to other content. This is accomplished by further reducing the score of that string. In contrast, the message header 3120 will ultimately include the account number. Accordingly, although extracted item 3142 (account number) is present, it serves to reduce the importance of string 3134 because there is no need to include the repetitive information about the account number in the summary. This is accomplished by increasing the score of that string in order to bring it closer to 1, the level at which a string is considered uninteresting. In other words, even if that string may not be part of the cluster template, it is treated as such, or almost as such, for the purpose of summarization. In the shown embodiment, the message summary seed is comprised of string 3130 (and therefore the most valuable contents) and the message summary 3160 is produced, by extracting the full paragraph of text from the original email that contains the seed. This method of summary generation tends to produce sufficient contextual information to make the summary seed data easy to comprehend. Of course, other methods for summary generation could have produced a shorter summary for this simple example.

Figure 15:
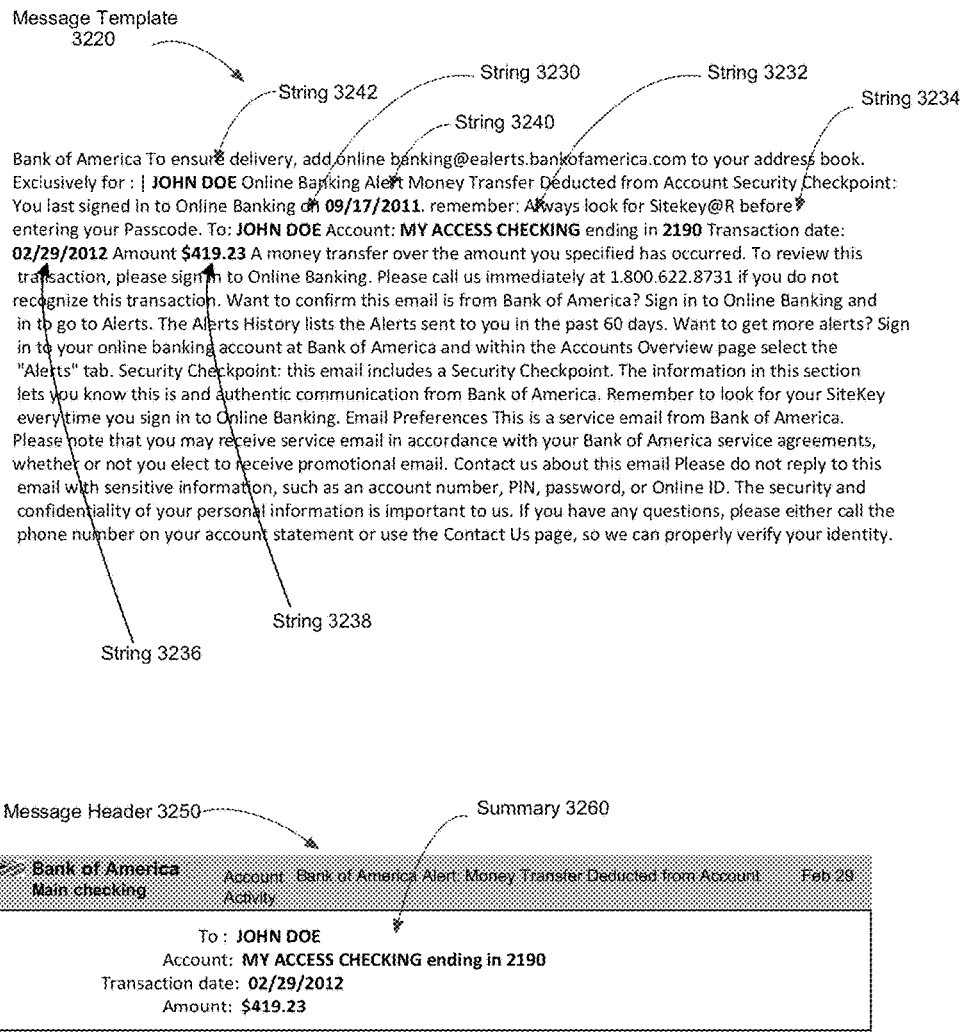

In some embodiments, the HTML structure of the message is used to determine the summary, sometimes referred to as HTML message summarization. Consider for example, message 3210, shown in FIG. 14, which includes an HTML table. In this embodiment, message template 3220 (shown in FIG. 15) is produced and strings 3230-3242 (shown in bold) are deemed most interesting, as their score is less than one. String 3238 (the transaction amount) is the most unique string in the whole email (i.e. the lowest frequency score) followed by string 3236 and string 3240, both dates. The importance of string 3236 is augmented (i.e. its score is reduced) by the fact that it contains an extracted item (the transaction date). Consequently, the message summary seed includes string 3238 and 3236. The HTML structure of the message is examined next, in order to return the entire table structure that encompass this most valuable contents. In the example shown, this process produces message summary 3260 depicted in FIG. 15. In some embodiments, the formatting of the table, as it appears in the original email, may be maintained in the message summary. In contrast to the previous example where there was no HTML structure containing the message seed, in this example the account number was included in the summary in order to easily reuse the HTML structure of the original email.

Message Acquisition and Processing

Figure 16:
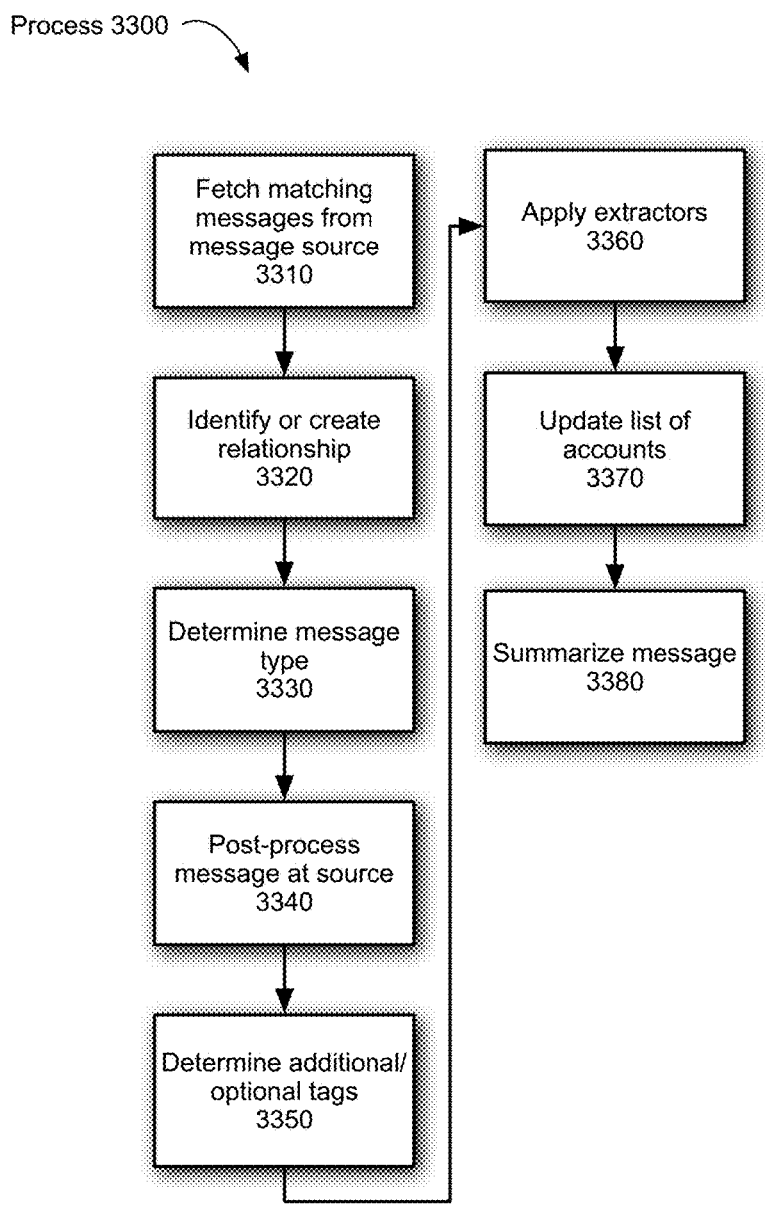
FIG. 16 is a process flow diagram for message acquisition according to one embodiment.

FIG. 16 is a process flow diagram for message acquisition and processing according to one embodiment. FIG. 16 includes a process 3300 that starts at step 3310 with the acquisition of messages from a message source. As discussed previously, the message source can take many forms; for this discussion, email message sources will be focused on; however, the process is similar for other types of sources.

Step 3310 of message acquisition is guided, in one embodiment, by two collections of data: the white list of institutions containing valid email domain names and addresses, and the list of email streams created by the aggregate user base. In one embodiment, the message contents are stored in the storage model at this step. In the embodiment of FIG. 2, the message contents can be stored in the messages 212 and be associated with a message stream 211.

The institution white list can be represented as a collection of domain names the institutions are known to use for sending emails to consumers. An inbound email is deemed to be from the white list if the from address matches either "<pattern>", "*.<pattern>", or "*@<pattern>" where <pattern> represents a string on the white list. The first case is an exact email address match which enables matching specific email addresses from the domain name instead of just domain names. To understand the other two cases, consider the following example: assuming that "united.com" is a domain name on the white list, then sales@united.com and tickets@econfirms.united.com would both be matches, but david@manchesterunited.com would NOT be a match. Other white list patterns can be used by other embodiments, e.g. regular expressions, enhanced Perl-style regular expressions, and more. Additionally, information from the user base as a whole can be used to improve the white list for all users or to allow a user to add an institution to the white list for their system account.

Additionally, embodiments can make use of other information such as DNS keys, sender policy framework (SPF) information, and spam filtering techniques to improve matches. Thus for example "spam.sales@united.com" is probably a poor match for a "united.com" rule.

Also the white list may contain information to distinguish between corporate (potentially address book contact emails) from general emails. For example, if HP uses "corp.hp.com" for employee email addresses those should be treated differently from "promos@hp.com".

In some embodiments, machine-learning techniques similar to those used for spam filtering, can be used to filter out messages that were generated by humans from those generated automatically by automated systems. This is important, for example, if a user receives machine generated emails from United Airlines but also happens to have a friend working at United Airlines who sends him personal messages using his work email account.

Next, at steps 3320-3380 additional functions occur to process the message. These functions may sometimes be referred to collectively as analysis or message analysis for ease of reference. Additionally, references to the embodiment and data model of FIG. 2 will be used when appropriate to clarify the description. These analysis steps may make use of a rules engine. In one embodiment, each rule can be comprised of a set of assertions that must be triggered in order for the rule to fire (logical AND). An assertion consists of three parts:

Property—which corresponds to a field or section of the email message or its headers, Predicate—which describes the type of assertion, and Expression—which is a regular expression to be compared with the value of the attribute based on the predicate.

Examples of properties include: Sender Name, Sender Address, Subject Line, Body Intro (e.g. the first three sentences of the body of the message), or Message Body, etc.

At step 3320, relationships (see relationship 230) are identified and/or created. Consider for example, this message from a user's brokerage company (e.g. Brokerage1): "You added a new payee to account *4567 for online banking: Company1, Account #*1234". This single email message permits the inference of a brokerage account #*4567 with company Brokerage1, the inference of an account #*1234 with Company1, and also a payment method for that Company1 account. Thus one message enabled the identification of multiple relationships (Brokerage1, Company1), multiple institution accounts (the brokerage account #*4567 at Brokerage1 and the account #*1234 at Company1), and one payment method (brokerage account as a way to pay Company1 account via online bill pay) without user intervention. This is a powerful feature for simplifying not only initial account setup, but a powerful tool on an ongoing basis for users. This process of step 3320 can sometimes be referred to as account inference.

Continuing at step 3330, the message type can be determined. In one embodiment, each message is assigned exactly one type. The types, according to one embodiment, are grouped into message type groups and include:

| Group | Message Types | Description |
| --- | --- | --- |
| Account Alerts | Account Activity Alert | Debit or Credit in financial account |
| | Account Management Alert | Change in user profile or account settings (ex. Password, email, etc.) |
| | Account Verification | Contains confirmation link in order to verify account ownership |
| Bills | Bill | Email contains a bill or notification of a new bill |
| Document | Document | Email contains document (ex. Receipt, Trade confirmation, etc.) |
| | Document Notification | Email contains a notification of a new document(s) |
| Order | Order Confirmation | Purchase confirmation with items purchased and price |
| | Order Shipment Notification | Order has been shipped |
| | Order Pickup Notification | Order is ready for pickup |
| | Order Cancellation | Order has been cancelled |
| | Order Renewal | A recurring order is up for renewal |
| | Order Update | Misc. order update not listed above |
| Travel | Travel Confirmation | Travel confirmation for flights, hotels, car rentals, etc. |
| | Travel Cancellation | Cancellation of an earlier reservation |
| | Travel Update | Change to an existing reservation |
| | Checkin Notification | A flight is available for check in on line |
| | Boarding Pass | Email contains a boarding pass |
| Event | Event Confirmation | Confirmation of a ticket purchase, restaurant reservation, etc. |
| | Event Cancellation | Cancellation of an earlier reservation or purchase |
| | Event Update | Change in time, location or event reminders, etc. |
| Newsletter | Newsletter | Specifically requested media contents (e.g. Wall Street Journal, etc.) |
| Updates | Account Update | User requested account updates (ex. Fare alerts, real estate listings, etc.) |
| | Social Update | Updates from social network accounts |
| Feedback Requests | Feedback Request | Requests to complete a survey, write a review, etc. |
| Promos | Promo | General advertising (may contain promo codes or special offer, etc.) |

Examples of predicates include: Ends With, Contains, Matches Exactly, or Does Not Contain, etc.

Some examples of assertions include: Sender Address Ends With "@schwab.com"; Body Intro Contains "Your statement is ready to view online"; and Sender Name Matches "Customer Care." Each of these three assertions could be combined into a single rule for identifying certain messages from Schwab.

Next, at step 3340, a message that has been typed successfully, can be post-processed on the message source in one of several ways based on user preferences:

Mark read or leave unread,

Leave or delete from the inbox,

Move (or not) to a predetermined folder, and

Move (or not) to a message type specific folder.

Under some embodiments, the specific post-processing option that is applied to individual messages may be a user account controlled option for each message source, and for each message type. Post-processing the message on the server and, in particular, marking the message as read and/or filing it to a folder can reduce inbox clutter for the registered user.

At step 3350, optional tags can be assigned. Tags further categorize the contents of a message in greater detail according to one embodiment. The optional tags enable greater refinement such as indicating that an account management alert also has a coupon.

At step 3360, selected extractor functions for the specific message type are applied. In some embodiments the extracted data is stored in the data model, e.g. with the messages 212, associated with the institution account 231, or elsewhere. The extractor functions can be implemented with a mixture of rules, pattern matching, templates, and/or other approaches as noted above. The extraction functions can be text and/or image processing functions for working on the messages. For example, some of the extractors can be implemented with templates and/or matching of regular expressions. In some embodiments, the extracted items include:

| | |
|---|---|
| Account number | Order date |
| Account balance | Order number |
| Payee account name | Item ordered |
| Account type | Tracking number |
| | Transaction amount |
| | Estimated delivery date |
| | Customer number |
| Payment due date | Promo code |
| Payment amount | Expiry date |
| Autopay Y/N | |
| Autopay date | |
| Confirmation number | Pickup/dropoff date |
| Flight number | Pickup/dropoff time |
| Airline name | Pickup/dropoff location |
| Departure/Arrival date | |
| Departure/Arrival time | |
| Departure/Arrival city | |
| Departure/Arrival airport | |
| Event date | Checkin/checkout date |
| Event time | Checkin/checkout time |
| Event name | Hotel name |
| Event location | |
| Event contact | |
| Ticket number | |

The above extractors are exemplary only.

Next at step 3370, the account list (e.g. institution accounts 231) can be updated. As discussed above, a single message may enable the inference of multiple relationships 230 and institution accounts 231.

Lastly, at step 3380, the message summarization technique described above, can be applied.

The preceding description has focused on email-style message sources; however, the approach is generally applicable to any of the message sources 110. Additionally, the preceding description has been described sequentially; however, parallel, partially parallel, and/or out-of-order execution of the steps of process 3300 may be possible. Additionally, during process 3300, the system may focus on a small time period, e.g. messages since last checked or the last 24 hours, etc. This can conserve time and resources to avoid re-scanning messages already processed by the system. In some embodiments, state information for messages is maintained and used for selective retrieval by the system, e.g. record the message identifiers or the like for a message source and avoid repeated retrievals of previously retrieved items rather than using time periods to control retrieval.

Additional Embodiments

We have now described a system and processes that afford an easy way to provide a household management system with automatic message summarization.

Some additional embodiments and features include:

Message Summarization:
Alternative methods of generating clusters and cluster templates that consider messages from multiple institutions. This is particularly useful, for example, when multiple institutions make use of the same third party software or service for outbound message generation, and therefore message similarities, and near duplicates, can be observed across institutions.

Alternative methods of message summarization that rely on extracted items, instead of a combination or cluster templates and extracted items. In some embodiments, messages summaries are based on pre-defined templates with placeholders for specific extracted values.

Alternative methods of message summarization that do not rely on extracted contents (i.e. tables, text strings, extracted items, etc.) in order to produce a summary, or that do not rely on the formatting of original messages.

Alternative methods for message summary selection based on certain display characteristics, in addition to HTML tables; e.g. other groups of words or strings that are meant to be viewed as a whole. In some embodiments, such methods are based on CSS constructs, HTML constructs other than tables, font selection (i.e. Times roman vs. Cambria), font type (e.g. bold, italic, etc.), font size, or the contents of images, etc.

Alternative methods for message summarization in which the type of message influences the selection of the summarization method. In some embodiments, this includes the use of boiler plate removal for messages such as newsletters, wherein the boiler plate includes only those sections of the cluster template that are at the beginning or the end of the message.

Alternative methods for message summarization, include the systematic removal of ads from the message contents.

Alternative methods for cluster formation include methods that do not consider the order in which words appear in messages. In some embodiments, these include methods based on the vector space model such as TF-IDF (term frequency-inverse document frequency) weights.

Alternative uses of action buttons as part of the message summary. In some embodiments, alternative action buttons include, but are not limited to:
Go To Review—for the review of online documents,
Go To Archive—for online documents that need to be archived,
Go To Redeem—for purchased daily deals or coupons,
Go To Download—for purchased online items,
Go To Print—for purchased online event tickets,
Mark as Suspicious—for account alerts,
Mark as Verified—for account alerts or online purchases, and
Mark as Received—for delivery of purchases.

Inbox Summarization and Filtering:
Alternative methods of determining message type in addition to, or in conjunction with, a rules engine. In some embodiments, these methods include statistical classification methods such as frequentist procedures (both linear and non-linear) and Bayesian procedures. In some embodiments, a multiclass classification system (preferred in this application due to the large number of possible message types) can be implemented with a combination of multiple binary classifiers.

Alternative methods of determining message type that make use of the value of extracted items. For example, messages containing a departure time and departure airport may be travel related. The first message to contain such data may be the travel confirmation whereas subsequent message containing the same data may be a travel update. The two messages can be summarized differently, e.g. giving more emphasis to one over the other and/or by combining them into a single summary.

Alternative methods of grouping messages in an inbox summary, other than weekly or daily. In some embodiments, other time periods can be used. In some embodiments, in lieu of a specific time period, a pre-determined number of messages of each type, or each type group, can be shown in the email log area 2310, along with buttons to enable the user to show more messages of a given type either in line or by navigating to another page, or by filtering the contents of the email log area by the selected type or type group. In some embodiments, the type and number of messages shown in the email log area 2310 by default is based on user specified preferences. (e.g. show me all my account alerts for the last week along with their summaries and tell me how many messages I have received for each of the other message types, etc.)

Alternative means of filtering the email log area 2310 by message type instead of message type group. In some embodiments, this filtering can be incremental such that if the user has filtered by a message type group, further filtering by message type is then enabled. In other embodiments, this filtering can include exposing a series of additional filtering options for filtering based on message subject, e.g. whole or partial subject. These additional filters are context specific, e.g. based on the subject lines used by Bank of America when filtering for Bank America. Also similar near duplicate detection approaches to those described above can be used to identify clusters of subjects and present each cluster as a single filtering option.

Alternative means of filtering the email log area 2310 to summarize current deals available to the end user which could include, for example, (i) recent messages from daily deals sites such as Groupon or Living Social (e.g. $20 worth of groceries at Whole Foods for $10), unexpired and unused such daily deals that have already been purchased by the user, and (ii) recent promotions received from retailers that contain a promo code or coupon, etc. In some embodiments, the view resulting from such filtering can be customized by current user location (e.g. the user is near Whole Foods and could purchase a Groupon for Whole Foods). In some embodiments, this view can be customized by user preferences (e.g. only alert me for deals at Whole Foods, Tommy Bahama and REI). In some embodiments, this view is similar to FIG. 8 but for deals instead of purchases.

Alternative means of filtering the email log area 2310 by category of sending institutions. In some embodiments, the categories include but are not limited to: financial, retail, investment, insurance, healthcare, household, travel, government, automobile, employment, services, etc. In some embodiments, the view resulting by such filtering can be customized by location, by user preferences or both. In some embodiments, this view is similar to FIG. 8 but for the specified category instead of purchases.

Alternative means of presenting message summaries. In some embodiments, message summaries can incorporate selected elements of the message subject as appropriate and can be displayed without the message subject. In other embodiments, the contents of message summaries are aggregated in such way that the one to one correspondence between each message and its summary may be lost.

Alternative methods for filtering the email log area 2310 that is based on the contents of extracted items, instead of, or in addition to, institution name, institution category, message type, message type group, purchases, deals, or account name, etc. In some embodiments, such filtering supports ranges of extracted item values. Some example queries that would be supported by such filtering include, but are not limited to, show messages that:

contain a certain account number,
are related to a certain payee account name,
are related to credit card accounts,
are related to orders placed last February,
involve travel or events within a predetermined distance of a designated location, e.g. 50 miles of San Francisco,
contain the name of a certain hotel,
contain orders/purchases valued at more than a predetermined amount, e.g. $50,
involve anything expected to occur over the next two weeks, or
involve transactions in excess of a predetermined amount, e.g. $25.

The scope of the radar section could be extended to include additional events. In some embodiments, such events include, but are not limited to, user generated reminders (e.g. to cancel Wall Street Journal before the automatic renewal date), scheduled expiration of certain subscriptions, etc.

Alternative means of grouping and presenting messages such that critically important messages are made more salient. In some embodiments, critically important messages are displayed at the top of the email log area 2310. In some embodiments, the message header area of such messages may contain a special icon or text string in order to indicate urgency and/or criticality. In some embodiments, such messages may include, but are not limited to, messages that refer to the following situations:

Possible or suspected fraud or identity theft,
Unexpected change in travel itinerary such as flight cancellation,
Unexpected change in time or location of an event,
A credit card authorization has been denied by the card issuer,
A credit card on file is about to expire or has expired,
Unexpected account closure of termination of service,
A scheduled automatic payment has failed,
Reward account points/miles are about to expire,
An order that had been confirmed cannot be completed,
An order has been lost/destroyed in shipment,
Returned goods have not been received, or
An urgent message is available to view on a sender's web site.

Message Viewing and Threading:

Alternative means of threading message within the message viewer. In some embodiments, these include threading on any of the extracted item values, in addition to those already described herein. For example, hotel name, airport code, airline name, etc. In some embodiments, a generic extracted item such as a date can be used for threading messages, such that, for example, messages that contain either a payment due date, a travel date, an order date, a delivery date, an expiry date, departure/arrival date, pickup/dropoff date, etc. which is equal to a given date would be threaded.

In some embodiments, any of the filtering mechanisms described above could be used as threading mechanisms as well.

Some embodiments may directly integrate with a mail client such as Gmail, Outlook or Apple Mail in order to provide the user interface and related functionality discussed.

Any data structures and code described or referenced, above, are stored according to many embodiments on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

CONCLUSION

The preceding description is presented to enable the making and use of the invention. Various modifications to the disclosed embodiments will be apparent, and the general principles defined herein may be applied to other embodiments and applications without departing from the spirit and scope of the invention. Thus, the invention is not intended to be limited to the embodiments shown, but is to be accorded the widest scope consistent with the principles and features disclosed herein. The scope of the invention is defined by the appended claims.

What is claimed is:

1. A computer-implemented method including:
   accessing messages from a plurality of institutions sent to a plurality of users via a plurality of email accounts and grouping the messages using a processor into clusters of messages that share content to be summarized using a template;
   within a particular cluster of the messages from the plurality of institutions sent to the plurality of email accounts, using the processor to derive at least one cluster template
      that summarizes content shared by messages sent by multiple institutions in the plurality of institutions,
      that includes one or more institution placeholders for insertion of institution-specific variations on the cluster template and
      that includes message placeholders for insertion of message-specific information to complete an institution and message-specific summary;
   processing a specific message sent by a specific institution using the processor
      to identify the specific institution,
      to select a cluster template customized for the identified specific institution at the institution placeholders for use summarizing the specific message, and
      to extract message-specific information to insert into the message placeholders in the selected cluster template;
   combining the message-specific information and the selected cluster template customized for the identified specific institution using the processor to form a message summary; and
   transmitting the message summary for display.

2. The computer-implemented method of claim 1, wherein the message summary contains at least one HTML table extracted as message-specific information.

3. The computer-implemented method of claim 1, further including:
   determining that a message type for the cluster template for the particular cluster of the messages is from a set of message types including: account activity alert, account management alert, account verification, bill, bill notification, document, document notification, order confirmation, order shipment notification, order pickup notification, order cancellation, order renewal, order update, travel confirmation, travel cancellation, travel update, checkin notification, boarding pass, event confirmation, event cancellation, event update, newsletter, account update, social update, feedback request, and promo; and
   using the determined message type to derive the cluster template.

4. The computer-implemented method of claim 1, further including:
   repeating the processing of a specific message and the combining to form a message summary for multiple messages that share the selected cluster template; and
   forming a threaded view that groups the multiple messages that share the selected cluster template.

5. The computer-implemented method of claim 1, wherein:
   the message-specific information is visible in a list or table view of message summaries without having to open the specific message.

6. The computer-implemented method of claim 1, further including:
   repeating the processing of a specific message and the combining to form a message summary for multiple messages that share a common event in time and space, determined from the extracted message-specific information; and
   forming a threaded view that groups the multiple messages that share the common event in time and space.

7. A computer system including:
   processors and memory coupled to the processors, the memory holding computer code that, when executed in the processors, cause the processors to perform a method including:
   accessing messages from a plurality of institutions sent to a plurality of email accounts and grouping the messages using code running on a processor into clusters of messages that share content to be summarized using a template;
   within a particular cluster of the messages from the plurality of institutions sent to the plurality of email accounts, using code running on a processor to derive at least one cluster template that summarizes content shared by messages sent by multiple institutions in the plurality of institutions, that includes one or more institution placeholders for insertion of institution-specific variations on the cluster template and that includes message placeholders for insertion of message-specific information to complete an institution and message-specific summary;

processing a specific message sent by a specific institution using code running on a processor to identify the specific institution, to select a cluster template customized for the identified specific institution at the institution placeholders for use summarizing the specific message, and to extract message-specific information to insert into the message placeholders in the selected cluster template;

combining the message-specific information and the selected cluster template customized for the identified specific institution using code running on a processor to form a message summary; and transmitting the message summary for display.

8. A non-transitory computer readable medium holding program constructions that, when combined with a computer system, prepare the computer system to implement a method including:

accessing messages from a plurality of institutions sent to a plurality of email accounts and grouping the messages using code running on a processor into clusters of messages that share content to be summarized using a template;

within a particular cluster of the messages from the plurality of institutions sent to the plurality of email accounts, using code running on a processor to derive at least one cluster template that summarizes content shared by messages sent by multiple institutions in the plurality of institutions, that includes one or more institution placeholders for insertion of institution-specific variations on the cluster template and that includes message placeholders for insertion of message-specific information to complete an institution and message-specific summary;

processing a specific message sent by a specific institution using code running on a processor to identify the specific institution, to select a cluster template customized for the identified specific institution at the institution placeholders for use summarizing the specific message, and to extract message-specific information to insert into the message placeholders in the selected cluster template;

combining the message-specific information and the selected cluster template customized for the identified specific institution using code running on a processor to form a message summary; and transmitting the message summary for display.

9. The computer system of claim 7, wherein the message summary contains at least one full sentence from the specific message, the at least one full sentence including at least one extracted item from extracted message-specific information.

10. The computer system of claim 7, wherein the message summary contains at least one HTML table extracted as message-specific information.

11. The computer system of claim 7, wherein the specific message includes HTML table elements from which the message-specific information is extracted.

12. The computer system of claim 7, further including:

determining that a message type for the cluster template for the particular cluster of the messages is from a set of message types including: account activity alert, account management alert, account verification, bill, bill notification, document, document notification, order confirmation, order shipment notification, order pickup notification, order cancellation, order renewal, order update, travel confirmation, travel cancellation, travel update, checkin notification, boarding pass, event confirmation, event cancellation, event update, newsletter, account update, social update, feedback request, and promo; and using the determined message type to derive the cluster template.

13. The computer system of claim 7, further including:

repeating the processing of a specific message and the combining to form a message summary for multiple messages that share the selected cluster template; and forming a threaded view that groups the multiple messages that share the selected cluster template.

14. The computer system of claim 13, wherein:

the multiple messages are from different institutions and have different customizations at the institution placeholders; and the threaded view groups the multiple messages from the different institutions.

15. The computer system of claim 7, wherein:

the message-specific information is visible in a list or table view of message summaries without having to open the specific message.

16. The computer system of claim 7, further including:

repeating the processing of a specific message and the combining to form a message summary for multiple messages that share a common event in time and space, determined from the extracted message-specific information; and forming a threaded view that groups the multiple messages that share the common event in time and space.

17. The computer system of claim 16, wherein:

the multiple messages are from different institutions and have different customizations at the institution placeholders; and the threaded view groups the multiple messages from the different institutions.

18. The non-transitory computer readable medium of claim 8, further holding instructions to implement the method including extracting multiple items of message-specific information to insert into the message placeholders from a set of item types consisting of: account number, account balance, payee account name, and account type.

19. The non-transitory computer readable medium of claim 8, wherein the message summary contains at least one HTML table extracted as message-specific information.

20. The non-transitory computer readable medium of claim 8, further holding instructions to implement the method including:

determining that a message type for the cluster template for the particular cluster of the messages is from a set of message types including: account activity alert, account management alert, account verification, bill, bill notification, document, document notification, order confirmation, order shipment notification, order pickup notification, order cancellation, order renewal, order update, travel confirmation, travel cancellation, travel update, checkin notification, boarding pass, event confirmation, event cancellation, event update, newsletter, account update, social update, feedback request, and promo; and using the determined message type to derive the cluster template.

21. The non-transitory computer readable medium of claim 8, further holding instructions to implement the method including:

repeating the processing of a specific message and the combining to form a message summary for multiple messages that share the selected cluster template; and forming a threaded view that groups the multiple messages that share the selected cluster template, the threaded view groups the multiple messages from different institutions.

22. The non-transitory computer readable medium of claim 8, wherein:

the message-specific information is visible in a list or table view of message summaries without having to open the specific message.

23. The non-transitory computer readable medium of claim 8, further holding instructions to implement the method including:

repeating the processing of a specific message and the combining to form a message summary for multiple messages that share a common event in time and space, determined from the extracted message-specific information; and forming a threaded view that groups the multiple messages that share the common event in time and space.

* * * * *